(12) United States Patent
Kawata et al.

(10) Patent No.: US 9,694,561 B2
(45) Date of Patent: Jul. 4, 2017

(54) HIGH STRENGTH STEEL SHEET AND HIGH STRENGTH GALVANIZED STEEL SHEET EXCELLENT IN SHAPEABILITY AND METHODS OF PRODUCTION OF SAME

(75) Inventors: Hiroyuki Kawata, Tokyo (JP); Naoki Maruyama, Tokyo (JP); Akinobu Murasato, Tokyo (JP); Akinobu Minami, Tokyo (JP); Masafumi Azuma, Tokyo (JP); Takuya Kuwayama, Tokyo (JP); Shigeru Yonemura, Tokyo (JP)

(73) Assignee: NIPPON STEEL & SUMITOMO METAL CORPORATION, Tokyo (JP)

( * ) Notice: Subject to any disclaimer, the term of this patent is extended or adjusted under 35 U.S.C. 154(b) by 500 days.

(21) Appl. No.: 14/235,681

(22) PCT Filed: Jul. 27, 2012

(86) PCT No.: PCT/JP2012/069226
§ 371 (c)(1),
(2), (4) Date: Jan. 28, 2014

(87) PCT Pub. No.: WO2013/018726
PCT Pub. Date: Feb. 7, 2013

(65) Prior Publication Data
US 2014/0170440 A1 Jun. 19, 2014

(30) Foreign Application Priority Data

Jul. 29, 2011 (JP) ................. 2011-167816

(51) Int. Cl.
| | |
|---|---|
| *B32B 15/01* | (2006.01) |
| *C23C 2/02* | (2006.01) |
| *C23C 2/06* | (2006.01) |
| *C23C 2/28* | (2006.01) |
| *C25D 5/36* | (2006.01) |
| *C21D 8/02* | (2006.01) |
| *C21D 9/46* | (2006.01) |
| *C21D 1/19* | (2006.01) |
| *C22C 38/00* | (2006.01) |
| *C22C 38/02* | (2006.01) |
| *C22C 38/04* | (2006.01) |
| *C22C 38/06* | (2006.01) |
| *C22C 38/08* | (2006.01) |
| *C22C 38/12* | (2006.01) |
| *C22C 38/14* | (2006.01) |
| *C22C 38/16* | (2006.01) |
| *C22C 38/34* | (2006.01) |
| *C22C 38/42* | (2006.01) |
| *C22C 38/44* | (2006.01) |
| *C22C 38/48* | (2006.01) |
| *C22C 38/50* | (2006.01) |
| *C22C 38/54* | (2006.01) |
| *C22C 38/58* | (2006.01) |

(52) U.S. Cl.
CPC ............. *B32B 15/013* (2013.01); *C21D 1/19* (2013.01); *C21D 8/0205* (2013.01); *C21D 8/0247* (2013.01); *C21D 8/0263* (2013.01); *C21D 9/46* (2013.01); *C22C 38/001* (2013.01); *C22C 38/002* (2013.01); *C22C 38/005* (2013.01); *C22C 38/02* (2013.01); *C22C 38/04* (2013.01); *C22C 38/06* (2013.01); *C22C 38/08* (2013.01); *C22C 38/12* (2013.01); *C22C 38/14* (2013.01); *C22C 38/16* (2013.01); *C22C 38/34* (2013.01); *C22C 38/42* (2013.01); *C22C 38/44* (2013.01); *C22C 38/48* (2013.01); *C22C 38/50* (2013.01); *C22C 38/54* (2013.01); *C22C 38/58* (2013.01); *C23C 2/02* (2013.01); *C23C 2/06* (2013.01); *C23C 2/28* (2013.01); *C25D 5/36* (2013.01); *C21D 2211/002* (2013.01); *C21D 2211/004* (2013.01); *C21D 2211/005* (2013.01); *C21D 2211/008* (2013.01); *Y10T 428/12799* (2015.01)

(58) Field of Classification Search
CPC ................ C21D 1/19; C21D 2211/002; C21D 2211/004; C21D 2211/005; C21D 2211/008; C21D 8/0205; C21D 8/0247; C21D 8/0263; C21D 9/46; C22C 38/001; C22C 38/002; C22C 38/005; C22C 38/02; C22C 38/04
See application file for complete search history.

(56) References Cited

U.S. PATENT DOCUMENTS

| | | | |
|---|---|---|---|
| 2011/0024004 A1* | 2/2011 | Azuma | ................ C21D 8/0236 148/533 |
| 2012/0222781 A1* | 9/2012 | Azuma | ................... C21D 9/46 148/518 |

FOREIGN PATENT DOCUMENTS

| | | | |
|---|---|---|---|
| EP | 1264911 A2 | | 12/2002 |
| JP | 5-271857 A | | 10/1993 |
| JP | H05271857 | * | 10/1993 |
| JP | 8-199288 A | | 8/1996 |
| JP | 8-311601 A | | 11/1996 |
| JP | 11-199973 A | | 7/1999 |
| JP | 11-279690 A | | 10/1999 |
| JP | 2001-355044 A | | 12/2001 |
| JP | 2004-100018 A | | 4/2004 |
| JP | 2004100018 | * | 4/2004 |
| JP | 2007-191747 A | | 8/2007 |
| JP | 2011111671 | * | 2/2011 |
| JP | 2011-111670 A | | 6/2011 |
| JP | 2011-111671 A | | 6/2011 |
| JP | 2011111671 A | * | 6/2011 |
| JP | WO2011065591 | * | 6/2011 |
| WO | WO 98/20180 A1 | | 5/1998 |
| WO | WO 2011/065591 A1 | | 6/2011 |

* cited by examiner

*Primary Examiner* — Jonathan Johnson
*Assistant Examiner* — Nicholas Wang
(74) *Attorney, Agent, or Firm* — Birch, Stewart, Kolasch & Birch, LLP

(57) ABSTRACT

High strength steel sheet which secures tensile maximum strength 900 MPa or more high strength while having excellent shapeability, which high strength steel sheet which is excellent in shapeability characterized by having a predetermined composition of ingredients, by the steel sheet structure including a ferrite phase and martensite phase, by the ratio of Cu particles incoherent with the bcc iron being 15% or more with respect to the Cu particles as a whole, by a density of Cu particles in the ferrite phase being $1.0 \times 10^{18}$/ $m^3$ or more, and by an average particle size of Cu particles in the ferrite phase being 2.0 nm or more.

20 Claims, No Drawings

HIGH STRENGTH STEEL SHEET AND HIGH STRENGTH GALVANIZED STEEL SHEET EXCELLENT IN SHAPEABILITY AND METHODS OF PRODUCTION OF SAME

TECHNICAL FIELD

The present invention relates to high strength steel sheet and high strength galvanized steel sheet which are excellent in shapeability and to methods of production of the same.

BACKGROUND ART

In recent years, there have been increasing demands for higher strength in the steel sheet which is used for automobiles etc. In particular, for the purpose of improving collision safety etc., high strength steel sheet with a tensile maximum stress of 900 MPa or more is also being used. Such high strength steel sheet is inexpensively formed in large volumes by press working it in the same way as soft steel sheet and is being used as structural members.

However, in recent years, along with the rapid increase in strength of high strength steel sheet, in particular in high strength steel sheet with a tensile maximum stress of 900 MPa or more, the problem has arisen of the shapeability becoming insufficient and of working accompanied with local deformation such as stretch-formability becoming difficult. Further, when a high speed tension force acts on a steel material, there was the problem that the fracture mode would easily change from ductile fracture to brittle fracture.

In the past, as one example of the art for strengthening a steel material, a high strength steel material which was hardened by causing the fine precipitation of Cu was known. PLT 1 discloses a Cu precipitation hardening type high strength steel material which contains C, Si, P, S, Al, N, and Cu in predetermined ranges, contains one or both of Mn: 0.1 to 3.0% and Cr: 0.1 to 3.0%, has an (Mn+Cr)/Cu of 0.2 or more, and has a balance of iron and unavoidable impurities, has an average ferrite crystal grain size of 3 μm or more, and has a ferrite area ratio of 60% or more.

Further, as one example of high strength steel sheet which achieves both shapeability and hole expandability, PLT 2 discloses high strength steel sheet which is excellent in shapeability and hole expandability which contains C, Si, Cu, and Mn in predetermined mass %, further suitably contains at least one of Al, Ni, Mo, Cr, V, B, Ti, Nb, Ca, and Mg, and has a hardness of the ferrite phase of Hv 150 to 240, has a volume ratio of residual austenite in the steel structure of 2 to 20%, and exhibits a tensile strength of 600 to 800 MPa.

PLT 3 discloses, as one example of high strength cold rolled steel sheet for working use which is excellent in fatigue characteristics, high strength cold rolled steel sheet for working use which is excellent in fatigue characteristics which is comprised of steel sheet containing C: 0.05 to 0.30%, Cu: 0.2 to 2.0%, and B: 2 to 20 ppm and which has a microstructure comprised of a volume ratio of 5% or more and 25% or less of residual austenite and ferrite and bainite and which has Cu present in the ferrite phase in the state of particles which are comprised of Cu alone of a size of 2 nm or less in a solid solution state and/or precipitated state.

PLT 4 discloses, as one example of composite structure high strength cold rolled steel sheet which is excellent in fatigue characteristics, composite structure high strength cold rolled steel sheet which is comprised of ferrite-martensite composite structure steel sheet which contains C: 0.03 to 0.20%, Cu: 0.2 to 2.0%, and B: 2 to 20 ppm and which has Cu present in the ferrite phase in the state of particles which are comprised of Cu alone of a size of 2 nm or less in a solid solution state and/or precipitated state.

PLT 5 discloses, as one example of super high strength steel sheet which is excellent in delayed fracture resistance, super high strength steel sheet which contains, by wt %, C: 0.08 to 0.30, Si: less than 1.0, Mn: 1.5 to 3.0, S: 0.010 or less, P: 0.03 to 0.15, Cu: 0.10 to 1.00, and Ni: 0.10 to 4.00, has a balance of iron and unavoidable impurities, contains one or more structures of martensite, tempered martensite, or bainite structures in a volume ratio of 40% or more, and has a strength of 1180 MPa or more.

PLT 6 discloses, as one example of high strength steel sheet which is excellent in press formability and corrosion resistance, high strength steel sheet which is excellent in press formability and corrosion resistance which satisfies the requirements of C: 0.08 to 0.20%, Si: 0.8 to 2.0%, Mn: 0.7 to 2.5%, P: 0.02 to 0.15%, S: 0.010% or less, Al: 0.01 to 0.10%, Cu: 0.05 to 1.0%, and Ni: 1.0% or less, has a balance of iron and unavoidable impurities, and satisfies the relationship of the following formula "0.4≤(10P+Si)/(10C+Mn+Cu+0.5Ni)≤1.6" (wherein, the notations of elements indicate the respective contents (%)), which steel sheet has residual austenite of 3 to 10% and a tensile strength of 610 to 760 MPa.

PLT 7 discloses, as one example of high strength thin gauge steel sheet, high strength thin gauge steel sheet which has a composition of ingredients which contains C: 0.05 to 0.3%, Si: 2% or less, Mn: 0.05 to 4.0%, P: 0.1% or less, S: 0.1% or less, Cu: 0.1 to 2%, and Si (%)/5 or more, Al: 0.1 to 2%, N: 0.01% or less, Ni: Cu (%)/3 or more (when Cu is 0.5% or less, not necessarily included) and satisfies "Si (%)+Al (%)≥0.5", "Mn (%)+Ni (%)≥0.5", has a structure which contains a volume ratio of 5% or more of residual austenite, and exhibits a tensile strength of 650 to 800 MPa.

CITATIONS LIST

Patent Literature

PLT 1: Japanese Patent Publication No. 2004-100018A
PLT 2: Japanese Patent Publication No. 2001-355044A
PLT 3: Japanese Patent Publication No. 11-279690A
PLT 4: Japanese Patent Publication No. 11-199973A
PLT 5: Japanese Patent Publication No. 08-311601A
PLT 6: Japanese Patent Publication No. 08-199288A
PLT 7: Japanese Patent Publication No. 05-271857A

SUMMARY OF INVENTION

Technical Problem

Conventional high strength steel sheet is hot rolled, pickled, and cold rolled, then is continuously annealed under predetermined conditions to make predetermined crystal phases precipitate in predetermined ratios in the steel sheet structure and thereby achieve both high strength and high workability.

However, in low alloy steel with low contents of added elements, the phase transformation proceeds quickly at the time of annealing treatment, so the extent of the operating range at which predetermined crystal phases can be made to precipitate at predetermined ratios becomes narrow and, as a result, the high strength steel sheet does not become stable in properties and varies in quality.

Further, conventional tensile strength 900 MPa or more high strength steel sheet was insufficient in workability. It was desired to improve the stretch flangeability and otherwise enhance the workability.

The present invention was made in consideration of this situation and has as its object the provision of tensile strength 900 MPa or more high strength steel sheet where the stretch flangeability is improved to improve the local deformation ability and where the tensile strength can be improved when high speed tension acts, and a method of production of the same.

Solution to Problem

The inventors etc. engaged in intensive studies on the steel sheet structure and method of production so as to achieve both improvement of the stretch flangeability and improvement of the tensile strength when high speed tension acts in high strength steel sheet. As a result, they learned that by making Cu efficiently precipitate in steel sheet, it is possible to achieve both improvement of the stretch flangeability and improvement of the tension strength when high speed tension acts. Further, they discovered that to form such a structure, it is sufficient to impart strain to the steel sheet during annealing of the steel sheet.

The invention was made as a result of further studies based on the above discovery and has as its gist the following:

(1) High strength steel sheet which is excellent in shapeability which contains, by mass %, C: 0.075 to 0.300%, Si: 0.30 to 2.50%, Mn: 1.30 to 3.50%, P: 0.001 to 0.030%, S: 0.0001 to 0.0100%, Al: 0.005 to 1.500%, Cu: 0.15 to 2.00%, N: 0.0001 to 0.0100%, and O: 0.0001 to 0.0100%, contains, as optional elements, Ti: 0.005 to 0.150%, Nb: 0.005 to 0.150%, B: 0.0001 to 0.0100%, Cr: 0.01 to 2.00%, Ni: 0.01 to 2.00%, Mo: 0.01 to 1.00%, W: 0.01 to 1.00%, V: 0.005 to 0.150%, and one or more of Ca, Ce, Mg, and REM: total 0.0001 to 0.50%, and has a balance of iron and unavoidable impurities, wherein the steel sheet structure contains a ferrite phase and martensite phase, a ratio of Cu particles incoherent with bcc iron is 15% or more with respect to the Cu particles as a whole, a density of Cu particles in the ferrite phase is $1.0 \times 10^{18}/m^3$ or more, and an average particle size of Cu particles in the ferrite phase is 2.0 nm or more.

(2) The high strength steel sheet which is excellent in shapeability of the (1) characterized in that the structure in a range of 1/8 thickness to 3/8 thickness of the high strength steel sheet comprises, by volume fraction, a ferrite phase: 10 to 75%, bainitic ferrite phase and/or bainite phase: 50% or less, tempered martensite phase: 50% or less, fresh martensite phase: 15% or less, and residual austenite phase: 20% or less.

(3) High strength galvanized steel sheet which is excellent in shapeability characterized by comprising the high strength steel sheet of the (1) or (2) on the surface of which a galvanized layer is formed.

(4) A method of production of high strength steel sheet which is excellent in shapeability characterized by comprising a hot rolling process of heating a slab which contains, by mass %, C: 0.075 to 0.300%, Si: 0.30 to 2.50%, Mn: 1.30 to 3.50%, P: 0.001 to 0.030%, S: 0.0001 to 0.0100%, Al: 0.005 to 1.500%, Cu: 0.15 to 2.00%, N: 0.0001 to 0.0100%, O: 0.0001 to 0.0100%, contains, as optional elements, Ti: 0.005 to 0.150%, Nb: 0.005 to 0.150%, B: 0.0001 to 0.0100%, Cr: 0.01 to 2.00%, Ni: 0.01 to 2.00%, Mo: 0.01 to 1.00%, W: 0.01 to 1.00%, V: 0.005 to 0.150%, and one or more of Ca, Ce, Mg, and REM: total 0.0001 to 0.50%, and has a balance of iron and unavoidable impurities, directly, or after cooling once, to 1050° C. or more, rolling with a lower limit of a temperature of 800° C. or the Ar3 transformation point, whichever is higher, and coiling it at 500 to 700° C. in temperature and an annealing process of heating the coiled steel sheet by an average heating rate at 550 to 700° C. of 1.0 to 10.0° C./sec up to a maximum heating temperature of 740 to 1000° C., then cooling by an average cooling rate from the maximum heating temperature to 700° C. of 1.0 to 10.0° C./sec, imparting strain to the steel sheet from the maximum heating temperature to 700, and cooling by a cooling rate from 700° C. to the Bs point or 500° C. of 5.0 to 200.0° C./sec.

(5) The method of production of high strength steel sheet which is excellent in shapeability of the above (5) characterized by having a cold rolling process, after the hot rolling process and before the annealing process, of pickling the coiled steel sheet, then rolling it by a screwdown rate of a screwdown rate 35 to 75%.

(6) The method of production of high strength steel sheet which is excellent in shapeability of the above (4) or (5) characterized by the strain being imparted to the steel sheet in the annealing process by applying 5 to 50 MPa of tension to the steel sheet while bending one time or more in a range giving an amount of tensile strain at the outermost circumference of 0.0007 to 0.0910.

(7) The method of production of high strength steel sheet which is excellent in shapeability of the above (6) characterized in that the bending is performed by pressing the steel sheet against a roll with a roll diameter of 800 mm or less.

(8) A method of production of high strength galvanized steel sheet which is excellent in shapeability characterized by producing high strength steel sheet by the method of production of high strength steel sheet of any of the above (4) to (7), then electrogalvanizing it.

(9) A method of production of high strength galvanized steel sheet which is excellent in shapeability characterized by producing high strength steel sheet by the method of production according to any one of (4) to (8) after the cooling to the Bs point or 500° C. of which performing hot dip galvanization.

(10) A method of production of high strength galvanized steel sheet which is excellent in shapeability according to (9) characterized by performing alloying treatment at 470 to 650° C. in temperature after the hot dip galvanization.

Advantageous Effects of Invention

According to the present invention, it is possible to provide high strength steel sheet which secures a tensile maximum strength 900 MPa or more high strength while has excellent stretch flangeability and other shapeability and also has excellent high strength tensile properties. Further, it is possible to provide high strength galvanized steel sheet which secures a tensile maximum strength 900 MPa or more high strength while has excellent stretch flangeability and other shapeability and also has excellent high strength tensile properties.

DESCRIPTION OF EMBODIMENTS

First, the structure of the high strength steel sheet of the present invention will be explained. The structure of the high strength steel sheet of the present invention is not particularly limited so long as a tensile maximum strength 900 MPa or more strength can be secured.

For example, the structure may be any of a single phase structure of martensite, a dual phase structure comprised of martensite and bainite, a dual phase structure comprised of ferrite and martensite, a composite phase structure comprised of ferrite, bainite, and residual austenite and other such structures including ferrite, bainite, martensite, and residual austenite alone or compositely. Alternatively, it may be a structure of these structures further including a pearlite structure.

The ferrite phase which is included in the structure of the high strength steel sheet may be any of precipitation strengthened ferrite, as-worked nonrecrystallized ferrite, or partial dislocation-restored ferrite.

The steel sheet structure of the high strength steel sheet of the present invention is preferably comprised of, in the range of 1/8 to 3/8 thickness centered on 1/4 of the sheet thickness, by volume fraction, ferrite phase: 10 to 75%, bainitic ferrite phase and/or bainite phase: 50% or less, tempered martensite phase: 50% or less, fresh martensite phase: 15% or less, and residual austenite phase: 20% or less. If the high strength steel sheet has such a steel sheet structure, high strength steel sheet which has a more excellent shapeability results.

Here, the structure is made one in the range of 1/8 to 3/8 thickness because this range of structure may be considered to represent the structure of the steel sheet as a whole. If such a steel sheet structure in the range of 1/8 to 3/8 thickness, it can be judged that the steel sheet as a whole has such a structure.

The phases which can be included in the structure of the steel sheet will be explained.

Ferrite Phase

The ferrite phase is a structure which is effective for improving the ductility and is preferably contained in the steel sheet structure in a volume fraction of 10 to 75%. The volume fraction of the ferrite phase in the steel sheet structure, from the viewpoint of the ductility, is more preferably 15% or more, still more preferably 20% or more. The ferrite phase is a soft structure, so to sufficiently raise the tensile strength of steel sheet, the volume fraction of the ferrite phase which is contained in the steel sheet structure is more preferably made 65% or less, still more preferably made 50% or less.

Bainitic Ferrite Phase and/or Bainite Phase

The bainitic ferrite phase and/or bainite phase is a structure with a good balance of strength and ductility and is preferably contained in the steel sheet structure in a volume fraction of 10 to 50%. Further, the bainitic ferrite phase and/or bainite phase is a microstructure which has a strength intermediate to that of a soft ferrite phase and hard martensite phase and tempered martensite phase and residual austenite phase. From the viewpoint of the stretch flangeability, inclusion of 15% or more is more preferable and inclusion of 20% or more is further preferable. If the volume fraction of the bainitic ferrite phase and/or bainite phase rises, the yield stress becomes higher, so from the viewpoint of the shape freezability, the volume fraction of the bainitic ferrite phase and/or bainite phase is preferably 50% or less.

Tempered Martensite Phase

The tempered martensite phase is a structure which greatly improves the tensile strength. From the viewpoint of the tensile strength, the volume fraction of the tempered martensite is preferably 10% or more. If the volume fraction of the tempered martensite which is contained in the steel sheet structure increases, the yield stress becomes higher, so from the viewpoint of the shape freezability, the volume fraction of tempered martensite phase is preferably 50% or less.

Fresh Martensite Phase

The fresh martensite phase greatly improves the tensile strength. On the other hand, it forms starting points of fracture and greatly degrades the stretch flangeability, so it preferably limited to a volume fraction of 15% or less. To raise the stretch flangeability, it is more preferable to make the volume fraction of the fresh martensite phase 10% or less, still more preferably 5% or less.

Residual Austenite Phase

The residual austenite phase greatly improves the strength and ductility. On the other hand, it becomes starting points of fracture and sometimes causes the stretch flangeability to deteriorate, so is preferably made a volume fraction of 20% or less. To raise the stretch flangeability, the volume fraction of the residual austenite phase is more preferably made 15% or less. To obtain the effect of improvement of the strength and ductility, the volume fraction of the residual austenite phase is preferably 3% or more, more preferably 5% or more.

Others

The steel sheet structure of the high strength steel sheet of the present invention may further contain a pearlite phase and/or coarse cementite phase or other structure. However, if the steel sheet structure of high strength steel sheet contains a large amount of pearlite phase and/or coarse cementite phase, the bendability deteriorates. Therefore, the volume fraction of the pearlite phase and/or coarse cementite phase which is contained in the steel sheet structure is preferably a total of 10% or less, more preferably 5% or less.

The volume fractions of the different structures which are contained in the steel sheet structure of the high strength steel sheet of the present invention can, for example, be measured by the following method:

The volume fraction of the residual austenite phase is obtained by examining the plane parallel to the sheet surface of the steel sheet and at 1/4 thickness by X-ray analysis, calculating the area fraction, and deeming that value as the volume fraction.

The volume fractions of the ferrite phase, bainitic ferrite phase, bainite phase, tempered martensite phase, and fresh martensite phase which are contained in the steel sheet structure of the high strength steel sheet of the present invention are obtained by obtaining samples with sheet thickness cross-sections parallel to the rolling direction as observed surfaces, polishing the observed surfaces, etching them by Nital, then examining the range of 1/8 thickness to 3/8 thickness centered at 1/4 of sheet thickness by using a field emission scanning electron microscope (FE-SEM) to measure the area fraction, and deeming that value as the volume fraction.

Next, the microstructure of the high strength steel sheet of the present invention will be explained.

The microstructure of the high strength steel sheet of the present invention has to be one where the density of Cu particles is $\geq 1.0 \times 10^{18}/m^3$, the average particle size of the Cu particles is 2.0 nm or more, and the ratio of Cu particles where the Cu particles and surrounding bcc iron are incoherent in the total Cu particles is 15% or more.

The "bcc iron" is the general term for ferrite, bainite, and bainitic ferrite with crystal structures of body centered cubic lattices. If the Cu particles are coherent with the bcc iron, the strength is greatly improved. Cu particles which are not coherent with the bcc iron obstruct the development of the dislocation substructure at the bcc iron. Along with this, aggregation of dislocations at the time of large strain deformation becomes difficult, the formation of voids is suppressed, and as a result the stretch flangability is improved.

The density of Cu particles is preferably $5.0 \times 10^{18}/m^3$ or more, more preferably $1.0 \times 10^{19}/m^3$ or more.

Fine Cu particles easily maintain coherence with the bcc iron and are small in contribution to the stretch flangeability, so the lower limit of the average particle size of the Cu particles is made 2.0 nm or more. The average particle size of the Cu particles is more preferably 4.0 nm or more, still more preferably 6.0 nm or more.

If the number of Cu particles which are incoherent with the bcc iron is less than 15%, the improvement of the stretch flangeability becomes insufficient. Therefore, the number of Cu particles has to be 15% or more, preferably is 25% or more, more preferably is 35% or more.

The average particle size, coherence, and density of the Cu particles can be evaluated as follows:

A sample is cut out from the steel sheet at ¼ thickness and is examined using a high resolution transmission electron microscope (HRTEM). Electron energy-loss spectroscopy (EELS) is used to confirm the composition of the Cu particles. These are investigated for particle size and coherence with the bcc iron. The size of the particles was made the average of the particle sizes of 20 or more particles. Further, the ratio of the precipitates which are incoherent with the bcc iron in the number of particles observed was found.

The Cu particle density is measured by two methods in accordance with the average particle size. If the average particle size is less than 3 nm, a three-dimensional atom probe (3D-AP) is used to cut out and test samples from ¼ thickness of the steel sheet. The test is performed until 20 or more Cu particles are obtained or until the measured volume exceeds 50000 $nm^3$. The density is obtained by dividing the number of particles by the measured volume. On the other hand, if the average particle size is 3 nm or more, the number of Cu particles in a 10000 $nm^2$ to 1 $\mu m^2$ field is measured, convergent-beam electron diffraction (CBED) is used to measure the thickness of the observed part of the test piece, this is multiplied with the observed area to find the observed volume, and the number of Cu particles is divided by the observed volume to find the Cu particle density.

The means for measuring the composition, particle size, and coherence of the Cu particles are not limited to the above techniques. For example, the particles may be observed using a field-emission transmission electron microscope (FE-TEM) etc.

Next, the composition of ingredients of the high strength steel sheet of the present invention will be explained. Note that in the following explanation, "%" shall mean "mass %".

C: 0.075 to 0.300%

C is included for raising the strength of the high strength steel sheet. If the content of C exceeds 0.300%, the weldability becomes insufficient. From the viewpoint of the weldability, the content of C is preferably 0.250% or less, more preferably 0.220% or less. If the content of C is less than 0.075%, the strength falls and a 900 MPa or more tensile maximum strength cannot be secured. To raise the strength, the content of C is preferably 0.090% or more, more preferably 0.100% or more.

Si: 0.30 to 2.50%

Si is an element which suppresses the formation of iron-based carbides in steel sheet and is required for raising the strength and shapeability. If the content of Si exceeds 2.50%, the steel sheet becomes brittle and the ductility deteriorates. From the viewpoint of the ductility, the content of Si is preferably 2.20% or less, more preferably 2.00% or less. On the other hand, if the content of Si is less than 0.30%, a large amount of coarse iron-based carbides form in the annealing process, and the strength and shapeability deteriorate. From this viewpoint, the lower limit of Si is preferably 0.50% or more, more preferably 0.70% or more.

Mn: 1.30 to 3.50%

Mn is added to raise the strength of the steel sheet. If the content of Mn exceeds 3.50%, coarse Mn concentrated parts form at the center of thickness of the steel sheet, embrittlement easily occurs, and trouble such as cracking of the cast slab easily occurs. Further, if the content of Mn exceeds 3.50%, the weldability also deteriorates. Therefore, the content of Mn has to be made 3.50% or less. From the viewpoint of the weldability, the content of Mn is preferably 3.20% or less, more preferably 3.00% or less. On the other hand, if the content of Mn is less than 1.30%, soft structures are formed in large amounts during the cooling after the annealing, so it becomes difficult to secure a 900 MPa or more tensile maximum strength. Therefore, the content of Mn has to be made 1.30% or more. To raise the strength, the content of Mn is more preferably 1.50% or more, still more preferably 1.70% or more.

P: 0.001 to 0.030%

P tends to precipitate at the center of thickness of steel sheet and causes embrittlement of the weld zone. If the content of P exceeds 0.030%, the weld zone becomes greatly brittle, so the content of P is limited to 0.030% or less. The lower limit of the content of P is not particularly limited so long as the effect of the present invention is exhibited. However, if making the content of P less than 0.001%, the manufacturing costs greatly increase, so 0.001% is made the lower limit.

S: 0.0001 to 0.0100%

S has a detrimental effect on the weldability and the manufacturability at the time of casting and at the time of hot rolling. Accordingly, the upper limit of the content of S is made 0.0100% or less. S bonds with Mn to form coarse MnS which lowers the ductility and stretch flangeability, so 0.0050% or less is preferable, while 0.0025% or less is more preferable. The lower limit of the content of S is not particularly limited so long as the effects of the present invention are exhibited. However, if the content of S is less than 0.0001%, the manufacturing costs greatly increase, so 0.0001% is made the lower limit.

Al: 0.005 to 1.500%

Al suppresses the formation of iron-based carbides and raises the strength and shapeability of the steel sheet. If the content of Al exceeds 1.500%, the weldability becomes poor, so the upper limit of the content of Al is made 1.500%. From the viewpoint of the weldability, the content of Al is preferably made 1.200% or less, more preferably 0.900% or less. Al is an element which is effective as a deoxidizing material as well, but if the content of Al is less than 0.005%, the effect as a deoxidizing material is not sufficiently obtained, so the lower limit of the content of Al is made 0.005% or more. To sufficiently obtain the effect of deoxidation, the amount of Al is preferably made 0.010% or more.

N: 0.0001 to 0.0100%

N forms coarse nitrides which cause the ductility and stretch flangeability to deteriorate, so has to be kept down in content. If the content of N exceeds 0.0100%, this tendency becomes more remarkable, so the content of N is made 0.0100% or less. Further, N becomes a cause of formation of blowholes at the time of welding, so the smaller the content, the better. The lower limit of the content of N is not particularly set so long as the effect of the present invention is exhibited. However, if the content of N is made less than 0.0001%, the manufacturing costs greatly increase, so 0.0001% is made the lower limit value.

O: 0.0001 to 0.0100%

O forms oxides which cause the ductility and stretch flangeability to deteriorate, so has to be kept down in content. If the content of O exceeds 0.0100%, the deterioration of the stretch flangeability becomes remarkable, so the content of O is made 0.0100% or less. The content of O is preferably 0.0080% or less, more preferably 0.0060% or less. The lower limit of the content of O is not particularly limited so long as the effect of the present invention is exhibited. However, if the content of O is less than 0.0001%, the manufacturing costs greatly increase, so 0.0001% is made the lower limit.

Cu: 0.15 to 2.00%

Cu is an important element in the present invention. Cu is present in the steel as fine particles. The Cu particles which are coherent or semi-coherent with the surrounding bcc phase in particular increase the strength of steel sheet. Cu particles are incoherent with the surrounding bcc iron in particular suppress the formation of dislocation substructures inside the steel sheet to thereby raise the shapeability. In the present invention, to sufficiently obtain the effect of the Cu particles, the content of Cu has to be made 0.15% or more. The content of Cu is preferably 0.30% or more, more preferably 0.40% or more. On the other hand, if the content of Cu exceeds 2.00%, the weldability is impaired, so the content of Cu is made 2.00% or less. From the viewpoint of the weldability, the content of Cu is preferably 1.80% or less, more preferably 1.50% or less.

The high strength steel sheet of the present invention may further, in accordance with need, contain the following elements:

Ni: 0.01 to 2.00%

Ni suppresses embrittlement which occurs due to addition of Cu in the high temperature region, so may be deliberately added for the purpose of improving the productivity. To obtain this effect, the content of Ni has to be made 0.01% or more. Making it 0.05% or more is more preferable, while making it 0.10% or more is still more preferable. If the content of Ni exceeds 2.00%, the weldability is impaired, so the content of Ni is made 2.00% or less.

Ti: 0.005 to 0.150%

Ti is an element which contributes to the rise in strength of the steel sheet through precipitation strengthening, fine grain strengthening by suppression of growth of ferrite crystal grains, and dislocation strengthening through suppression of recrystallization. If the content of Ti exceeds 0.150%, precipitation of carbonitrides increases and the shapeability deteriorates, so the content of Ti is made 0.150% or less. From the viewpoint of the shapeability, the content of Ti is more preferably 0.100% or less, still more preferably 0.070% or less. To sufficiently obtain the effect of the rise in strength by Ti, the content of Ti has to be made 0.005% or more. To raise the strength of the steel sheet, the content of Ti is preferably 0.010% or more, more preferably 0.015% or more.

Nb: 0.005 to 0.150%

Nb is an element which contributes to the rise in strength of the steel sheet through precipitation strengthening, fine grain strengthening by suppression of growth of ferrite crystal grains, and dislocation strengthening through suppression of recrystallization. If the content of Nb exceeds 0.150%, precipitation of carbonitrides increases and the shapeability deteriorates, so the content of Nb is made 0.150% or less. From the viewpoint of the shapeability, the content of Nb is more preferably 0.100% or less, still more preferably 0.060% or less. To sufficiently obtain the effect of the rise in strength by Nb, the content of Nb has to be made 0.005% or more. To raise the strength of the steel sheet, the content of Nb is preferably 0.010% or more, more preferably 0.015% or more.

V: 0.005 to 0.150%

V is an element which contributes to the rise in strength of the steel sheet by precipitation strengthening, fine grain strengthening by suppression of growth of ferrite crystal grains, and dislocation strengthening through suppression of recrystallization. If the content of V exceeds 0.150%, precipitation of carbonitrides increases and the shapeability deteriorates, so the content is made 0.150% or less. To sufficiently obtain the effect of raising the strength by V, the content has to be 0.005% or more.

B: 0.0001 to 0.0100%

B is an element which suppresses phase transformation at a high temperature and is effective for increasing the strength and can be added in place of part of the C and/or Mn. If the content of B exceeds 0.0100%, the workability while hot is impaired and the productivity falls, so the content of B is made 0.0100% or less. From the viewpoint of the productivity, the content of B is preferably 0.0050% or less, more preferably 0.0030% or less. To sufficiently obtain higher strength by B, the content of B has to be made 0.0001% or more. To effectively increase the strength of the steel sheet, the content of B is preferably 0.0003% or more, more preferably 0.0005% or more.

Mo: 0.01 to 1.00%

Mo is an element which suppresses phase transformation at a high temperature and is effective for increasing the strength and can be added in place of part of the C and/or Mn. If the content of Mo exceeds 1.00%, the workability when hot is impaired and the productivity falls, so the content of Mo is made 1.00% or less. To sufficiently obtain higher strength by Mo, the content has to be 0.01% or more.

W: 0.01 to 1.00%

W is an element which suppresses phase transformation at a high temperature and is effective for increasing the strength and can be added in place of part of the C and/or Mn. If the content of W exceeds 1.00%, the workability when hot is impaired and the productivity falls, so the content of W is made 1.00% or less. To sufficiently obtain higher strength by W, the content has to be 0.01% or more.

Cr: 0.01 to 2.00%

Cr is an element which suppresses phase transformation at a high temperature and is effective for increasing the strength and can be added in place of part of the C and/or Mn. If the content of Cr exceeds 2.00%, the workability when hot is impaired and the productivity falls, so the content of Cr is made 2.00% or less. To sufficiently obtain higher strength by Cr, the content has to be 0.01% or more.

One or More of Ca, Ce, Mg, Zr, Hf, and REM: Total 0.0001 to 0.5000%

Ca, Ce, Mg, and REM are elements which are effective for improving the shapeability. One or more can be added. If the content of the one or more elements which are selected from Ca, Ce, Mg, and REM exceeds a total of 0.5000%, the ductility is liable to be impaired, so the total of the contents of the elements is made 0.5000% or less. To sufficiently obtain the effect of improvement of the shapeability of the steel sheet, the total of the contents of the elements has to be 0.0001% or more. From the viewpoint of the shapeability, the total of the contents of the elements is preferably 0.0005% or more, more preferably 0.0010% or more.

"REM" is an abbreviation for "rare earth metal" and indicates the elements which belong to the lanthanoid series. In the present invention, the REM or Ce is often added as a Misch metal. Sometimes, elements of the lanthanoid series in addition to La or Ce are contained compositely. Further, even when elements of the lanthanoid series other than La and Ce are included as unavoidable impurities, the effects of the present invention are exhibited. Further, even if adding metal La or Ce, the effects of the present invention are exhibited.

Above, the composition of ingredients of the present invention was explained, but so long as in a range not impairing the properties of the steel sheet of the present invention, for example, elements other than the essential added elements may also be included as impurities which are derived from the starting materials.

The high strength steel sheet of the present invention can also be made high strength galvanized steel sheet on the surface of which a galvanized layer or galvannealed layer is formed. By forming a galvanized layer on the surface of the high strength steel sheet, steel sheet which has excellent corrosion resistance results. Further, by forming a galvannealed layer on the surface of the high strength steel sheet, steel sheet which has excellent corrosion resistance and which has excellent coating adhesion results.

Next, the method of production of the high strength steel sheet of the present invention will be explained.

To produce the high strength steel sheet of the present invention, first, a slab which has the above-mentioned composition of ingredients is cast. As the slab which is used for hot rolling, for example, it is possible to use a continuously cast slab or a slab which is produced by a thin slab caster etc. For the method of production of the high strength steel sheet of the present invention, it is preferable to use a process such as continuous casting-direct rolling (CC-DR) where the steel is cast, then immediately hot rolled.

The slab heating temperature in the hot rolling process has to be 1050° C. or more. If the slab heating temperature is low, the finish rolling temperature falls below the $Ar_3$ point. As a result, two-phase rolling of the ferrite phase and austenite phase results, so the hot rolled sheet structure becomes an uneven mixed grain structure. The uneven structure is not eliminated even after the cold rolling and annealing process and therefore the ductility and bendability deteriorate. Further, if the finish rolling temperature falls, the rolling load increases and the rolling becomes difficult or shape defects are liable to be invited in the steel sheet after rolling. The upper limit of the slab heating temperature is not particularly set so long as the effect of the present invention is exhibited, but it is not preferable economically to set the heating temperature to an excessively high temperature, so the upper limit of the slab heading temperature is preferably made 1350° C. or less.

The $Ar_3$ point can be calculated by the following formula:

$$Ar_3 (° C.) = 901 - 325 \times C + 33 \times Si - 92 \times (Mn + Ni/2 + Cr/2 + Cu/2 + Mo/2) + 52 \times Al$$

In the above formula, C, Si, Mn, Ni, Cr, Cu, Mo, and Al are the contents of the different elements (mass %).

The finish rolling temperature of the hot rolling is made the higher of 800° C. or the $Ar_3$ point as the lower limit and 1000° C. as the upper limit. If the finish rolling temperature is less than 800° C., the rolling load at the time of finish rolling becomes high, the rolling becomes difficult, and shape defects are liable to be invited in the hot rolled steel sheet which is obtained after rolling. If the finish rolling temperature is less than the $Ar_3$ point, the hot rolling becomes two-phase region rolling of the ferrite phase and austenite phase and the hot rolled steel sheet structure will sometimes become an uneven mixed grain structure.

The upper limit of the finish rolling temperature is not particularly set so long as the effect of the present invention is exhibited, but if the finish rolling temperature is made excessively high, to secure that temperature, the slab heating temperature has to be made excessively high. Therefore, the upper limit temperature of the finish rolling temperature is preferably made 1000° C. or less.

The steel sheet after rolling is coiled at 500 to 700° C. If coiling the steel sheet at a temperature exceeding 700° C., the oxides which are formed on the steel sheet surface excessively increase in thickness and the pickling ability deteriorates. To raise the pickling ability, the coiling temperature is preferably 680° C. or less, more preferably 660° C. or less. If the coiling temperature becomes less than 500° C., the hot rolled steel sheet becomes excessively high in strength and cold rolling becomes difficult. From the viewpoint of lightening the load in cold rolling, the coiling temperature is preferably made 550° C. or more. 600° C. or more is more preferable.

The coiled steel sheet is preferably cooled by a cooling rate of 25° C./hour or less. This is to promote the precipitation of Cu.

The thus produced hot rolled steel sheet is pickled. Due to the pickling, the oxides on the steel sheet surface can be removed. This is important from the point of improving the chemical convertability of the cold rolled high strength steel sheet of the final product or the hot dip coatability of cold rolled steel sheet for hot dip galvanized or galvannealed steel sheet use. The pickling may be just a single treatment or may be divided into a plurality of treatments.

The pickled steel sheet may be supplied as is to the annealing process, but by cold rolling it by a screwdown rate of 35 to 75%, steel sheet with a high thickness precision and excellent shape is obtained. If the screwdown rate is less than 35%, it is difficult to hold the shape flat and the final product becomes poor in ductility, so the screwdown rate is made 35% or more. If the screwdown rate exceeds 75%, the cold rolling load becomes too great and cold rolling becomes difficult. From this, the upper limit of the screwdown rate is made 75%. The number of rolling passes and the screwdown rate for each pass are not particularly prescribed so long as the effect of the present invention is exhibited.

Next, the obtained hot rolled steel sheet or cold rolled steel sheet is subjected to annealing treatment.

First, the steel sheet was heated by an average heating rate from 550 to 700° C. of 1.0 to 10.0° C./sec, preferably 2.0 to 5.0° C./sec, up to the maximum heating temperature. The maximum heating temperature was made 740 to 1000° C. Due to this treatment, the crystal structure of the Cu precipitates formed in the previous hot rolling process is made an fcc (face-centered cubic lattice). Part of the Cu precipitates made an fcc at this point of time dissolve in the austenite and/or ferrite in the heating process and hold the fcc structure even in the later cooling process, so can be utilized as Cu precipitates incoherent with the bcc iron.

If the maximum heating temperature is less than 740° C., coarse iron-based carbides remain undissolved in the steel sheet and act as starting points of fracture, so the shapeability is remarkably degraded. To decrease the remaining undissolved iron-based carbides, the maximum heating temperature is preferably made 760° C. or more. If the maximum heating temperature exceeds 1000° C., the Cu particles melt during the heating and the number of Cu particles which are incoherent with the bcc iron becomes smaller, so the stretch flangeability deteriorates. To leave a large number of Cu particles incoherent with the bcc iron, the maximum heating temperature is preferably 970° C. or less, more preferably 950° C. or less.

Next, the steel sheet is cooled by an average cooling rate from the maximum heating temperature to 700° C. of 1.0 to 10.0° C./sec. Furthermore, in the temperature region from maximum heating temperature to 700° C., the steel sheet is given strain. As the method of giving strain, for example, it is possible to use the method of applying 5 to 50 MPa tension while bending one or more times in a range giving a tensile strain at the outermost circumference of 0.0007 to 0.0910. Due to this, it is possible to newly promote the formation of nuclei for Cu precipitates which are coherent or semi-coherent with the surrounding bcc phase. The bent steel sheet may be bent back.

If the tension which is applied to the steel sheet is less than 5 MPa, the precipitation of Cu particles is sometimes not sufficiently promoted. To promote the precipitation of Cu particles and raise the shapeability more, the tension is more preferably made 10 MPa or more, still more preferably 15 MPa or more. If the tension exceeds 50 MPa, the steel sheet may plastically deform and the shape may not be held.

If the amount of strain is less than 0.0007, sufficient formation of nuclei does not occur and the shapeability easily deteriorates. From the viewpoint of the shapeability, the amount of stress is preferably 0.0010 or more. If the amount of strain exceeds 0.0910, the shape is not held, so the amount of strain is preferably made 0.0910 or less. To maintain the shape of the steel sheet, the amount of strain is more preferably 0.0500 or less, still more preferably 0.0250 or less.

The thickness of the steel sheet is preferably 0.6 mm to 10.0 mm. If the thickness is less than 0.6 mm, the shape of the steel sheet sometimes cannot be held. If the thickness exceeds 10.0 mm, the temperature inside the steel sheet becomes hard to control.

The bending may be performed by, for example, applying tension while pressing against a roll. The diameter of the roll is preferably 800 mm or less to obtain a sufficient amount of strain. Further, if using a roll with a diameter less than 50 mm, the maintenance costs of the facility increase, so making the roll diameter 50 mm or more is preferable.

After this, the steel sheet is cooled from 700° C. to the Bs point (bainite transformation start temperature) or 500° C. by a cooling rate of 5.0 to 200.0° C./sec. Bainite or bainitic ferrite starts to form at a temperature below the Bs point, so the cooling rate may also be slowed. Even at a temperature higher than the Bs point, if 500° C. or less, the ferrite does not grow much at all, so the cooling rate may be slowed. The Bs point can be calculated by the following formula:

$$Bs(° C.)=820-290C/(1-VF)-37Si-90Mn-65Cr-50Ni+70Al$$

In the above formula, VF is the volume fraction of ferrite, while C, Mn, Cr, Ni, Al, and Si are the amounts of addition of these elements (mass %).

Note that, it is difficult to directly measure the volume fraction of the ferrite phase during production of high strength steel sheet, so in the present invention, a small piece of the cold rolled steel sheet is cut out before running the sheet through the continuous annealing line, that small piece is annealed by the same temperature history as the case of running it through the continuous annealing line, the change in volume of the ferrite phase of the small piece is measured, the result is used to calculate a numerical value, and that value is used as the volume fraction VF of the ferrite. This measurement may be performed using the result of the first measurement operation when producing steel sheet under the same conditions. The value does not have to be measured each time. Measurement is performed again when greatly changing the production conditions. Of course, it is also possible to observe the microstructure of the actually produced steel sheet and feed back the results to the production the next time and on.

The annealed steel sheet is held at 250 to 500° C. for 60 to 1000 seconds to form hard structures, then is cooled down to room temperature. After cooling it down to room temperature, the steel sheet may be cold rolled by 0.05 to 3.00% for the purpose of correcting the shape.

The annealed steel sheet may be electroplated to obtain a plated steel sheet. Further, during the cooling from maximum heating temperature to room temperature, for example, after the cooling down to 500° C. or after holding, it may be dipped in a galvanization bath to obtain hot dip galvanized steel sheet. After dipping the steel sheet in the galvanization bath, it may be treated for alloying in a range of 470 to 650° C. Furthermore, a film comprised of P oxides and/or composite oxides containing P may be formed.

Examples

Slabs which have the chemical ingredients (compositions) of A to AL which are shown in Tables 1 and 2 were cast, then immediately after casting were hot rolled, cooled, coiled, and pickled under the conditions which are shown in Tables 3 to 5. After that, Experiments 4, 9, 14, 19, 25, 29, 87, and 90 left the hot rolled steel sheets as they were, while the other experiments cold rolled them under the conditions which are described in Tables 3 to 6 after pickling. After that, an annealing process was applied under the conditions which are shown in Tables 7 to 10 to obtain the steel sheets of Experiments 1 to 114.

Note that, Experiment 102 is an example in which the upper limit of the amount of Cu is exceeded. The results of the weldability test conducted after the hot rolling were poor, so the subsequent tests were suspended.

TABLE 1

| Experiment | C mass % | Si mass % | Mn mass % | P mass % | S mass % | Al mass % | N mass % | O mass % |
|---|---|---|---|---|---|---|---|---|
| A | 0.087 | 1.75 | 1.91 | 0.014 | 0.0009 | 0.025 | 0.0032 | 0.0021 |
| B | 0.089 | 0.83 | 2.41 | 0.012 | 0.0031 | 0.052 | 0.0031 | 0.0017 |
| C | 0.134 | 1.67 | 1.55 | 0.018 | 0.0006 | 0.030 | 0.0037 | 0.0015 |
| D | 0.230 | 0.94 | 1.72 | 0.009 | 0.0006 | 0.012 | 0.0054 | 0.0009 |
| E | 0.151 | 1.32 | 2.16 | 0.015 | 0.0026 | 0.042 | 0.0039 | 0.0018 |
| F | 0.182 | 0.64 | 2.42 | 0.007 | 0.0041 | 0.033 | 0.0032 | 0.0010 |
| G | 0.112 | 0.55 | 1.73 | 0.007 | 0.0022 | 0.070 | 0.0020 | 0.0013 |
| H | 0.147 | 1.37 | 1.65 | 0.005 | 0.0023 | 0.052 | 0.0047 | 0.0029 |
| I | 0.123 | 0.54 | 1.89 | 0.010 | 0.0037 | 0.058 | 0.0026 | 0.0013 |
| J | 0.103 | 1.03 | 2.24 | 0.008 | 0.0009 | 0.033 | 0.0042 | 0.0018 |
| K | 0.266 | 0.35 | 2.20 | 0.013 | 0.0025 | 1.023 | 0.0036 | 0.0022 |
| L | 0.101 | 0.79 | 2.04 | 0.009 | 0.0019 | 0.226 | 0.0051 | 0.0032 |
| M | 0.207 | 1.77 | 1.79 | 0.007 | 0.0041 | 0.028 | 0.0039 | 0.0004 |
| N | 0.229 | 1.56 | 1.39 | 0.011 | 0.0033 | 0.032 | 0.0026 | 0.0025 |
| O | 0.097 | 0.59 | 1.68 | 0.010 | 0.0050 | 0.338 | 0.0037 | 0.0029 |
| P | 0.188 | 0.95 | 2.07 | 0.007 | 0.0025 | 0.053 | 0.0042 | 0.0016 |
| Q | 0.186 | 1.78 | 1.48 | 0.005 | 0.0018 | 0.044 | 0.0052 | 0.0008 |
| R | 0.194 | 1.16 | 2.43 | 0.008 | 0.0048 | 0.046 | 0.0027 | 0.0018 |
| S | 0.094 | 2.26 | 1.89 | 0.005 | 0.0031 | 0.031 | 0.0037 | 0.0005 |
| T | 0.160 | 0.61 | 2.10 | 0.013 | 0.0016 | 0.033 | 0.0034 | 0.0022 |
| U | 0.221 | 0.50 | 2.27 | 0.008 | 0.0037 | 0.123 | 0.0019 | 0.0004 |
| V | 0.188 | 1.37 | 1.54 | 0.010 | 0.0059 | 0.064 | 0.0017 | 0.0010 |
| W | 0.121 | 1.29 | 1.72 | 0.011 | 0.0013 | 0.035 | 0.0035 | 0.0034 |
| X | 0.131 | 0.73 | 2.72 | 0.013 | 0.0008 | 0.341 | 0.0019 | 0.0016 |
| Y | 0.231 | 0.53 | 2.61 | 0.013 | 0.0044 | 0.536 | 0.0043 | 0.0008 |
| Z | 0.103 | 1.04 | 1.74 | 0.009 | 0.0015 | 0.031 | 0.0050 | 0.0007 |
| AA | 0.102 | 0.98 | 1.84 | 0.014 | 0.0031 | 0.022 | 0.0039 | 0.0012 |

TABLE 1-continued

| Experiment | C mass % | Si mass % | Mn mass % | P mass % | S mass % | Al mass % | N mass % | O mass % |
|---|---|---|---|---|---|---|---|---|
| AB | 0.009 | 1.05 | 1.81 | 0.014 | 0.0027 | 0.017 | 0.0040 | 0.0006 |
| AC | 0.097 | 0.05 | 1.80 | 0.006 | 0.0025 | 0.019 | 0.0042 | 0.0005 |
| AD | 0.102 | 0.97 | 0.51 | 0.009 | 0.0027 | 0.016 | 0.0039 | 0.0005 |
| AE | 0.104 | 0.98 | 1.87 | 0.008 | 0.0031 | 0.025 | 0.0035 | 0.0009 |
| AF | 0.098 | 1.03 | 1.80 | 0.012 | 0.0029 | 0.002 | 0.0041 | 0.0007 |
| AG | 0.170 | 1.96 | 2.85 | 0.014 | 0.0020 | 0.229 | 0.0019 | 0.0009 |
| AH | 0.209 | 1.89 | 2.62 | 0.011 | 0.0018 | 0.016 | 0.0076 | 0.0013 |
| AI | 0.098 | 1.19 | 1.69 | 0.007 | 0.0045 | 0.067 | 0.0082 | 0.0011 |
| AJ | 0.098 | 1.39 | 2.00 | 0.008 | 0.0017 | 0.741 | 0.0058 | 0.0004 |
| AK | 0.137 | 1.12 | 1.82 | 0.008 | 0.0033 | 1.301 | 0.0037 | 0.0002 |
| AL | 0.213 | 0.39 | 2.73 | 0.011 | 0.0036 | 0.355 | 0.0039 | 0.0008 |

TABLE 2

| Experiment | Ti mass % | Nb mass % | B mass % | Cr mass % | Ni mass % | Cu mass % | Mo mass % | V mass % | Ca mass % | Ce mass % | Mg mass % | Zr mass % | Hf mass % | REM mass % | |
|---|---|---|---|---|---|---|---|---|---|---|---|---|---|---|---|
| A |  |  |  |  |  | 0.49 |  |  |  |  |  |  |  |  | Inv. ex. |
| B |  |  |  |  |  | 0.56 |  |  |  |  |  |  |  |  | Inv. ex. |
| C |  |  |  | 1.14 |  | 0.37 |  |  |  |  |  |  |  |  | Inv. ex. |
| D |  |  |  |  | 0.58 | 0.60 |  |  |  |  |  |  |  |  | Inv. ex. |
| E | 0.040 |  |  |  | 0.50 | 0.21 |  |  |  |  |  |  |  |  | Inv. ex. |
| F |  | 0.040 |  |  | 0.30 | 0.32 |  |  |  |  |  |  |  |  | Inv. ex. |
| G |  |  | 0.0024 |  | 0.09 | 0.41 |  |  |  |  |  |  |  |  | Inv. ex. |
| H |  |  |  | 0.67 | 0.40 | 0.44 |  |  |  |  |  |  |  |  | Inv. ex. |
| I |  |  |  |  | 0.13 | 0.28 | 0.27 |  |  |  |  |  |  |  | Inv. ex. |
| J |  |  |  |  |  | 0.18 |  |  |  |  |  |  |  |  | Inv. ex. |
| K |  |  |  |  | 0.71 | 0.78 |  | 0.0019 |  |  |  |  |  |  | Inv. ex. |
| L | 0.011 | 0.007 |  |  | 0.65 | 0.68 |  |  |  |  |  |  |  |  | Inv. ex. |
| M |  |  |  |  | 0.47 | 0.55 | 0.152 |  |  |  |  |  |  |  | Inv. ex. |
| N | 0.065 |  | 0.0005 |  | 0.68 | 0.77 |  |  |  |  |  |  |  |  | Inv. ex. |
| O | 0.009 |  |  | 0.35 | 1.41 | 1.12 |  |  |  |  |  |  |  |  | Inv. ex. |
| P |  |  |  |  |  | 0.32 |  |  |  |  |  |  |  |  | Inv. ex. |
| Q |  |  |  |  | 0.84 | 0.94 |  |  | 0.0023 |  |  |  |  |  | Inv. ex. |
| R |  |  |  |  | 0.59 | 0.57 |  |  |  | 0.0016 |  |  |  |  | Inv. ex. |
| S |  |  |  | 0.61 | 0.99 | 0.58 | 0.10 |  |  |  |  |  |  |  | Inv. ex. |
| T |  |  |  |  | 1.13 | 1.34 |  |  |  |  |  |  |  |  | Inv. ex. |
| U | 0.025 | 0.018 | 0.0010 | 0.15 | 0.42 | 0.88 | 0.08 |  | 0.0007 | 0.0015 |  |  |  |  | Inv. ex. |
| V |  |  |  |  | 0.30 | 0.34 |  |  |  |  |  | 0.0021 |  |  | Inv. ex. |
| W |  |  |  |  | 1.04 | 0.69 |  |  |  |  |  |  | 0.0015 |  | Inv. ex. |
| X |  |  |  |  | 0.39 | 0.49 |  |  |  |  |  |  |  | 0.0024 | Inv. ex. |
| Y | 0.024 |  | 0.0044 |  | 0.57 | 0.71 |  |  | 0.0012 |  |  |  |  |  | Inv. ex. |
| Z |  | 0.056 |  |  | 1.69 | 0.66 |  | 0.0027 |  |  |  |  |  |  | Inv. ex. |
| AA |  |  |  |  | 0.42 | 0.00 |  |  |  |  |  |  |  |  | Comp. ex. |
| AB |  |  |  |  | 0.42 | 0.46 |  |  |  |  |  |  |  |  | Comp. ex. |
| AC |  |  |  |  | 0.39 | 0.41 |  |  |  |  |  |  |  |  | Comp. ex. |
| AD |  |  |  |  | 0.45 | 0.45 |  |  |  |  |  |  |  |  | Comp. ex. |
| AE |  |  |  |  | 0.39 | 0.12 |  |  |  |  |  |  |  |  | Comp. ex. |
| AF |  |  |  |  | 0.43 | 2.80 |  |  |  |  |  |  |  |  | Comp. ex. |
| AG |  |  |  |  | 0.13 | 0.28 |  |  |  |  |  |  |  |  | Inv. ex. |
| AH |  |  |  |  | 0.32 | 0.19 |  |  |  |  |  |  |  |  | Inv. ex. |
| AI |  |  |  |  | 0.91 | 0.20 |  |  |  |  |  |  |  |  | Inv. ex. |
| AJ |  |  |  |  | 0.72 | 0.41 |  |  |  |  |  |  |  |  | Inv. ex. |
| AK |  |  |  |  | 1.32 | 0.37 |  |  |  |  |  |  |  |  | Inv. ex. |
| AL |  |  |  |  | 0.64 | 0.43 |  |  |  |  |  |  |  |  | Inv. ex. |

TABLE 3

| Experiment | Chemical ingredients | Slab heating temp. ° C. | Ar3 transformation point ° C. | Hot rolling end temp. ° C. | Coiling temp. ° C. | Cooling rate after coiling ° C./sec | Cold rolling rate % | |
|---|---|---|---|---|---|---|---|---|
| 1 | A | 1215 | 741 | 957 | 644 | 15 | 50 | Inv. ex. |
| 2 | A | 1250 | 741 | 917 | 595 | 20 | 50 | Inv. ex. |
| 3 | A | 1270 | 741 | 899 | 658 | 15 | 50 | Inv. ex. |
| 4 | A | 1195 | 741 | 892 | 560 | 19 | 0 | Inv. ex. |
| 5 | A | 1230 | 741 | 727 | 640 | 14 | 50 | Comp. ex. |
| 6 | B | 1235 | 666 | 968 | 658 | 20 | 67 | Inv. ex. |
| 7 | B | 1250 | 666 | 898 | 645 | 21 | 67 | Inv. ex. |
| 8 | B | 1265 | 666 | 955 | 562 | 13 | 47 | Inv. ex. |
| 9 | B | 1245 | 666 | 889 | 646 | 13 | 0 | Inv. ex. |
| 10 | B | 1175 | 666 | 926 | 636 | 45 | 67 | Comp. ex. |
| 11 | C | 1175 | 709 | 966 | 604 | 16 | 50 | Inv. ex. |
| 12 | C | 1190 | 709 | 912 | 579 | 15 | 50 | Inv. ex. |

TABLE 3-continued

| Experiment | Chemical ingredients | Slab heating temp. °C. | Ar3 transformation point °C. | Hot rolling end temp. °C. | Coiling temp. °C. | Cooling rate after coiling °C./sec | Cold rolling rate % | |
|---|---|---|---|---|---|---|---|---|
| 13 | C | 1180 | 709 | 900 | 600 | 17 | 39 | Inv. ex. |
| 14 | C | 1205 | 709 | 924 | 615 | 21 | 0 | Inv. ex. |
| 15 | C | 1180 | 709 | 941 | 580 | 13 | 50 | Comp. ex. |
| 16 | D | 1260 | 645 | 886 | 583 | 18 | 40 | Inv. ex. |
| 17 | D | 1270 | 645 | 912 | 537 | 12 | 60 | Inv. ex. |
| 18 | D | 1240 | 645 | 901 | 643 | 15 | 60 | Inv. ex. |
| 19 | D | 1260 | 645 | 907 | 569 | 16 | 0 | Inv. ex. |
| 20 | D | 1195 | 645 | 928 | 600 | 20 | 40 | Comp. ex. |
| 21 | E | 1270 | 664 | 948 | 653 | 20 | 50 | Inv. ex. |
| 22 | E | 1250 | 664 | 891 | 586 | 18 | 50 | Inv. ex. |
| 23 | E | 1250 | 664 | 965 | 609 | 14 | 50 | Comp. ex. |
| 24 | E | 1175 | 664 | 949 | 639 | 11 | 50 | Inv. ex. |
| 25 | E | 1180 | 664 | 918 | 595 | 19 | 0 | Inv. ex. |
| 26 | F | 1215 | 612 | 921 | 632 | 14 | 71 | Inv. ex. |
| 27 | F | 1245 | 612 | 962 | 574 | 19 | 0 | Inv. ex. |
| 28 | F | 1285 | 612 | 960 | 556 | 12 | 72 | Inv. ex. |
| 29 | F | 1225 | 612 | 893 | 666 | 19 | 50 | Inv. ex. |
| 30 | F | 1260 | 612 | 896 | 581 | 16 | 50 | Comp. ex. |

TABLE 4

| Experiment | Chemical ingredients | Slab heating temp. °C. | Ar3 transformation point °C. | Hot rolling end temp. °C. | Coiling temp. °C. | Cooling rate after coiling °C./sec | Cold rolling rate % | |
|---|---|---|---|---|---|---|---|---|
| 31 | G | 1260 | 701 | 968 | 650 | 16 | 37 | Inv. ex. |
| 32 | G | 1250 | 701 | 967 | 535 | 13 | 47 | Inv. ex. |
| 33 | G | 1265 | 701 | 918 | 618 | 21 | 47 | Inv. ex. |
| 34 | G | 1275 | 701 | 893 | 578 | 16 | 47 | Comp. ex. |
| 35 | G | 1175 | 701 | 922 | 608 | 20 | 47 | Comp. ex. |
| 36 | H | 1210 | 677 | 897 | 644 | 20 | 40 | Inv. ex. |
| 37 | H | 1250 | 677 | 923 | 580 | 21 | 39 | Inv. ex. |
| 38 | H | 1265 | 677 | 907 | 578 | 13 | 50 | Inv. ex. |
| 39 | H | 1180 | 677 | 969 | 602 | 13 | 50 | Comp. ex. |
| 40 | H | 1205 | 677 | 969 | 609 | 17 | 50 | Comp. ex. |
| 41 | I | 1165 | 674 | 885 | 607 | 12 | 50 | Inv. ex. |
| 42 | I | 1200 | 674 | 904 | 616 | 21 | 50 | Inv. ex. |
| 43 | I | 1195 | 674 | 937 | 694 | 20 | 50 | Inv. ex. |
| 44 | I | 1205 | 674 | 902 | 631 | 13 | 50 | Comp. ex. |
| 45 | I | 1175 | 674 | 959 | 641 | 18 | 50 | Comp. ex. |
| 46 | J | 1175 | 687 | 970 | 584 | 18 | 67 | Inv. ex. |
| 47 | J | 1200 | 687 | 932 | 639 | 20 | 67 | Inv. ex. |
| 48 | J | 1190 | 687 | 938 | 687 | 19 | 67 | Inv. ex. |
| 49 | K | 1260 | 555 | 964 | 618 | 12 | 67 | Inv. ex. |
| 50 | K | 1195 | 555 | 975 | 610 | 15 | 60 | Inv. ex. |
| 51 | K | 1225 | 555 | 929 | 668 | 14 | 60 | Inv. ex. |
| 52 | L | 1195 | 646 | 888 | 569 | 21 | 60 | Inv. ex. |
| 53 | L | 1190 | 646 | 900 | 594 | 13 | 60 | Inv. ex. |
| 54 | L | 1260 | 646 | 930 | 585 | 17 | 60 | Inv. ex. |
| 55 | M | 1175 | 680 | 904 | 659 | 12 | 60 | Inv. ex. |
| 56 | M | 1225 | 680 | 929 | 586 | 19 | 50 | Inv. ex. |
| 57 | M | 1235 | 680 | 922 | 585 | 12 | 50 | Inv. ex. |
| 58 | N | 1225 | 684 | 924 | 623 | 16 | 50 | Inv. ex. |
| 59 | N | 1200 | 684 | 934 | 595 | 18 | 50 | Inv. ex. |
| 60 | N | 1270 | 684 | 909 | 584 | 20 | 50 | Inv. ex. |

TABLE 5

| Experiment | Chemical ingredients | Slab heating temp. °C. | Ar3 transformation point °C. | Hot rolling end temp. °C. | Coiling temp. °C. | Cooling rate after coiling °C./sec | Cold rolling rate % | |
|---|---|---|---|---|---|---|---|---|
| 61 | O | 1250 | 602 | 960 | 651 | 16 | 54 | Inv. ex. |
| 62 | O | 1240 | 602 | 945 | 597 | 17 | 54 | Inv. ex. |
| 63 | O | 1260 | 602 | 964 | 622 | 18 | 54 | Inv. ex. |
| 64 | P | 1215 | 666 | 914 | 614 | 19 | 54 | Inv. ex. |
| 65 | P | 1175 | 666 | 937 | 526 | 17 | 54 | Inv. ex. |
| 66 | P | 1200 | 666 | 912 | 653 | 15 | 54 | Inv. ex. |
| 67 | Q | 1230 | 681 | 943 | 584 | 17 | 47 | Inv. ex. |
| 68 | Q | 1270 | 681 | 916 | 609 | 16 | 67 | Inv. ex. |
| 69 | Q | 1220 | 681 | 898 | 530 | 13 | 67 | Inv. ex. |
| 70 | R | 1220 | 599 | 891 | 566 | 14 | 40 | Inv. ex. |
| 71 | R | 1180 | 599 | 911 | 677 | 16 | 50 | Inv. ex. |
| 72 | R | 1205 | 599 | 941 | 594 | 13 | 60 | Inv. ex. |
| 73 | S | 1205 | 666 | 909 | 564 | 18 | 60 | Inv. ex. |
| 74 | S | 1200 | 666 | 900 | 631 | 22 | 60 | Inv. ex. |
| 75 | S | 1190 | 666 | 899 | 670 | 12 | 60 | Inv. ex. |
| 76 | T | 1270 | 563 | 927 | 566 | 17 | 60 | Inv. ex. |
| 77 | T | 1180 | 563 | 953 | 582 | 17 | 60 | Inv. ex. |
| 78 | T | 1245 | 563 | 919 | 620 | 18 | 60 | Inv. ex. |
| 79 | U | 1245 | 566 | 933 | 606 | 10 | 50 | Inv. ex. |
| 80 | U | 1245 | 566 | 900 | 618 | 17 | 50 | Inv. ex. |
| 81 | U | 1230 | 566 | 891 | 650 | 22 | 50 | Inv. ex. |
| 82 | V | 1265 | 714 | 956 | 647 | 11 | 50 | Inv. ex. |
| 83 | V | 1190 | 714 | 961 | 573 | 17 | 50 | Inv. ex. |
| 84 | V | 1205 | 714 | 939 | 687 | 12 | 38 | Inv. ex. |
| 85 | W | 1270 | 667 | 963 | 661 | 13 | 50 | Inv. ex. |
| 86 | W | 1260 | 667 | 933 | 606 | 18 | 50 | Inv. ex. |
| 87 | W | 1260 | 667 | 886 | 590 | 13 | 0 | Inv. ex. |
| 88 | X | 1265 | 592 | 920 | 583 | 10 | 50 | Inv. ex. |
| 89 | X | 1220 | 592 | 954 | 658 | 19 | 50 | Inv. ex. |
| 90 | X | 1270 | 592 | 959 | 583 | 20 | 0 | Inv. ex. |

TABLE 6

| Experiment | Chemical ingredients | Slab heating temp. °C. | Ar3 transformation point °C. | Hot rolling end temp. °C. | Coiling temp. °C. | Cooling rate after coiling °C./sec | Cold rolling rate % | |
|---|---|---|---|---|---|---|---|---|
| 91 | Y | 1230 | 545 | 963 | 601 | 14 | 50 | Inv. ex. |
| 92 | Y | 1210 | 545 | 918 | 655 | 15 | 50 | Inv. ex. |
| 93 | Y | 1185 | 545 | 949 | 621 | 12 | 72 | Inv. ex. |
| 94 | Z | 1230 | 634 | 920 | 664 | 15 | 60 | Inv. ex. |
| 95 | Z | 1255 | 634 | 956 | 647 | 13 | 60 | Inv. ex. |
| 96 | Z | 1215 | 634 | 893 | 667 | 17 | 60 | Inv. ex. |
| 97 | AA | 1275 | 712 | 926 | 562 | 12 | 50 | Comp. ex. |
| 98 | AB | 1250 | 726 | 929 | 651 | 15 | 50 | Comp. ex. |
| 99 | AC | 1230 | 669 | 933 | 568 | 11 | 50 | Comp. ex. |
| 100 | AD | 1215 | 812 | 919 | 600 | 14 | 50 | Comp. ex. |
| 101 | AE | 1192 | 712 | 907 | 620 | 18 | 50 | Comp. ex. |
| 102 | AF | 1204 | 712 | 912 | 605 | 15 | — | Comp. ex. |
| 103 | AG | 1215 | 641 | 886 | 604 | 16 | 50 | Inv. ex. |
| 104 | AG | 1230 | 641 | 902 | 586 | 18 | 50 | Inv. ex. |
| 105 | AH | 1250 | 632 | 860 | 606 | 15 | 50 | Inv. ex. |
| 106 | AH | 1210 | 632 | 894 | 582 | 19 | 50 | Inv. ex. |
| 107 | AI | 1205 | 705 | 914 | 625 | 16 | 50 | Inv. ex. |
| 108 | AI | 1220 | 705 | 905 | 606 | 18 | 50 | Inv. ex. |
| 109 | AJ | 1220 | 718 | 920 | 599 | 17 | 50 | Inv. ex. |
| 110 | AJ | 1205 | 718 | 875 | 618 | 19 | 50 | Inv. ex. |
| 111 | AK | 1245 | 716 | 877 | 588 | 16 | 50 | Inv. ex. |
| 112 | AK | 1240 | 716 | 902 | 574 | 15 | 50 | Inv. ex. |
| 113 | AL | 1235 | 563 | 877 | 588 | 16 | 50 | Inv. ex. |
| 114 | AL | 1210 | 563 | 902 | 574 | 15 | 50 | Inv. ex. |

TABLE 7

| Experiment | Chemical ingredients | Steel type | Heating process Heating rate °C./sec | Heating process Heating temp. °C. | First cooling process Average cooling rate °C./sec | First cooling process Tension MPa | Second cooling process Average rate °C./sec | Second cooling process Bs point °C. | Holding process Time sec | Alloying process Alloying temp. °C. | |
|---|---|---|---|---|---|---|---|---|---|---|---|
| 1 | A | CR | 4.4 | 853 | 4.0 | 45 | 6.7 | 564 | 208 | | Inv. ex. |
| 2 | A | CR | 4.5 | 855 | 3.7 | 50 | 12.0 | 568 | 192 | | Inv. ex. |
| 3 | A | GA | 3.9 | 869 | 1.4 | 50 | 6.3 | 582 | 194 | 519 | Inv. ex. |
| 4 | A | HR | 3.0 | 837 | 2.3 | 50 | 8.8 | 550 | 186 | | Inv. ex. |
| 5 | A | CR | 3.5 | 853 | 2.9 | 45 | 10.3 | 573 | 318 | | Comp. ex. |
| 6 | B | CR | 3.3 | 799 | 4.0 | 35 | 8.8 | 550 | 115 | | Inv. ex. |
| 7 | B | CR | 1.4 | 819 | 3.2 | 9 | 11.8 | 564 | 272 | | Inv. ex. |
| 8 | B | GA | 2.8 | 811 | 2.3 | 50 | 5.4 | 572 | 178 | 474 | Inv. ex. |
| 9 | B | HR | 4.0 | 793 | 4.5 | 35 | 8.3 | 558 | 296 | | Inv. ex. |
| 10 | B | CR | 4.8 | 803 | 4.2 | 40 | 12.5 | 573 | 89 | | Comp. ex. |
| 11 | C | CR | 4.1 | 840 | 3.2 | 50 | 11.8 | 527 | 309 | | Inv. ex. |
| 12 | C | CR | 1.3 | 945 | 3.5 | 14 | 7.9 | 535 | 96 | | Inv. ex. |
| 13 | C | GI | 2.3 | 835 | 3.8 | 50 | 28.8 | 527 | 287 | | Inv. ex. |
| 14 | C | HR-GA | 4.1 | 836 | 2.2 | 16 | 31.1 | 536 | 109 | 480 | Inv. ex. |
| 15 | C | CR | 26 | 827 | 2.5 | 30 | 25.5 | 521 | 247 | | Comp. ex. |
| 16 | D | CR | 4.0 | 771 | 1.7 | 50 | 34.3 | 475 | 95 | | Inv. ex. |
| 17 | D | CR | 6.3 | 773 | 5.3 | 40 | 25.4 | 538 | 210 | | Inv. ex. |
| 18 | D | GI | 4.4 | 764 | 4.0 | 30 | 28.3 | 519 | 207 | | Inv. ex. |
| 19 | D | HR | 4.3 | 790 | 4.1 | 30 | 32.5 | 546 | 328 | | Inv. ex. |
| 20 | D | CR | 2.4 | 708 | 3.1 | 40 | 28.4 | — | 298 | | Comp. ex. |
| 21 | E | GI | 4.0 | 889 | 1.5 | 25 | 35.5 | 505 | 319 | | Inv. ex. |
| 22 | E | CR | 2.3 | 792 | 1.5 | 16 | 62.3 | 463 | 492 | | Inv. ex. |
| 23 | E | CR | 3.3 | 1111 | 2.7 | 35 | 76.5 | 519 | 224 | | Comp. ex. |
| 24 | E | CR | 3.8 | 807 | 2.7 | 13 | 84.9 | 515 | 453 | | Inv. ex. |
| 25 | E | HR-GA | 2.9 | 799 | 1.4 | 25 | 20.7 | 482 | 212 | 523 | Inv. ex. |
| 26 | F | CR | 6.4 | 761 | 2.3 | 6 | 107.3 | 494 | 182 | | Inv. ex. |
| 27 | F | HR | 2.9 | 828 | 3.2 | 50 | 36.2 | 524 | 576 | | Inv. ex. |
| 28 | F | CR | 2.7 | 919 | 2.5 | 27 | 25.5 | 527 | 182 | | Inv. ex. |
| 29 | F | EG | 2.6 | 758 | 2.5 | 21 | 43.2 | 510 | 385 | | Inv. ex. |
| 30 | F | CR | 2.9 | 808 | 33 | 40 | 32.8 | 534 | 381 | | Comp. ex. |

TABLE 8

| Experiment | Chemical ingredients | Steel type | Heating process Heating rate °C./sec | Heating process Heating temp. °C. | First cooling process Average cooling rate °C./sec | First cooling process Tension MPa | Second cooling process Average cooling rate °C./sec | Second cooling process Bs point °C. | Holding process Time sec | Alloying process Alloying temp. °C. | |
|---|---|---|---|---|---|---|---|---|---|---|---|
| 31 | G | CR | 7.8 | 816 | 1.6 | 50 | 9.4 | 591 | 293 | | Inv. ex. |
| 32 | G | CR | 3.3 | 816 | 2.2 | 19 | 7.5 | 601 | 75 | | Inv. ex. |
| 33 | G | EG | 2.7 | 810 | 3.9 | 20 | 106.2 | 605 | 238 | | Inv. ex. |
| 34 | G | CR | 4.5 | 813 | 0.1 | 50 | 11.3 | 535 | 304 | | Comp. ex. |
| 35 | G | CR | 3.4 | 812 | 4.3 | 0 | 11.4 | 620 | 317 | | Comp. ex. |
| 36 | H | CR | 3.2 | 790 | 2.6 | 45 | 59.8 | 433 | 511 | | Inv. ex. |
| 37 | H | CR | 1.9 | 826 | 1.6 | 19 | 72.2 | 492 | 174 | | Inv. ex. |
| 38 | H | GA | 2.2 | 812 | 1.7 | 26 | 79.7 | 472 | 138 | 523 | Inv. ex. |
| 39 | H | CR | 3.3 | 811 | 1.6 | 40 | 0.6 | 505 | 133 | | Comp. ex. |
| 40 | H | CR | 3.9 | 815 | 2.1 | No bending | 55.5 | 501 | 196 | | Comp. ex. |
| 41 | I | CR | 1.9 | 776 | 6.4 | 19 | 96.6 | 592 | 187 | | Inv. ex. |
| 42 | I | CR | 2.3 | 791 | 3.7 | 9 | 17.5 | 589 | 354 | | Inv. ex. |
| 43 | I | EG | 3.7 | 793 | 4.3 | 40 | 19.0 | 604 | 103 | | Inv. ex. |
| 44 | I | CR | 4 | 786 | 4.2 | 35 | 20.9 | 593 | 5200 | | Comp. ex. |
| 45 | I | CR | 3.3 | 802 | 1.2 | 35 | 16.9 | 581 | 7 | | Comp. ex. |
| 46 | J | CR | 2.3 | 818 | 3.7 | 45 | 71.6 | 560 | 88 | | Inv. ex. |
| 47 | J | CR | 3.3 | 819 | 3.4 | 40 | 43.4 | 579 | 627 | | Inv. ex. |
| 48 | J | GA | 4.5 | 826 | 2.2 | 15 | 36.5 | 558 | 110 | 480 | Inv. ex. |
| 49 | K | CR | 4.8 | 922 | 3.4 | 40 | 46.6 | 558 | 142 | | Inv. ex. |
| 50 | K | CR | 3.0 | 922 | 4.8 | 24 | 6.8 | 562 | 91 | | Inv. ex. |
| 51 | K | GA | 3.4 | 912 | 9.0 | 15 | 13.0 | 588 | 211 | 511 | Inv. ex. |
| 52 | L | CR | 4.3 | 837 | 4.0 | 26 | 9.3 | 578 | 335 | | Inv. ex. |
| 53 | L | CR | 4.0 | 832 | 4.5 | 13 | 9.7 | 569 | 100 | | Inv. ex. |
| 54 | L | GI | 4.7 | 822 | 3.5 | 16 | 9.8 | 573 | 325 | | Inv. ex. |
| 55 | M | CR | 2.3 | 791 | 3.0 | 40 | 15.0 | 489 | 205 | | Inv. ex. |
| 56 | M | CR | 2.3 | 810 | 5.8 | 45 | 18.0 | 534 | 401 | | Inv. ex. |

TABLE 8-continued

| Experiment | Chemical ingredients | Steel type | Heating process Heating rate °C./sec | Heating temp. °C. | First cooling process Average cooling rate °C./sec | Tension MPa | Second cooling process Average cooling rate °C./sec | Bs point °C. | Holding process Time sec | Alloying process Alloying temp. °C. | |
|---|---|---|---|---|---|---|---|---|---|---|---|
| 57 | M | GI | 2.8 | 821 | 3.9 | 27 | 22.4 | 519 | 81 | | Inv. ex. |
| 58 | N | CR | 4.6 | 825 | 2.7 | 21 | 17.4 | 527 | 337 | | Inv. ex. |
| 59 | N | CR | 3.0 | 882 | 2.5 | 35 | 44.5 | 539 | 356 | | Inv. ex. |
| 60 | N | EG | 3.8 | 810 | 3.4 | 35 | 37.5 | 517 | 310 | | Inv. ex. |

TABLE 9

| Experiment | Chemical ingredients | Steel type | Heating process Heating rate °C./sec | Heating temp. °C. | First cooling process Average cooling rate °C./sec | Tension MPa | Second cooling process Average cooling rate °C./sec | Bs point °C. | Holding process Time sec | Alloying process Alloying temp. °C. | |
|---|---|---|---|---|---|---|---|---|---|---|---|
| 61 | O | CR | 5.4 | 813 | 4.0 | 8 | 32.4 | 543 | 567 | | Inv. ex. |
| 62 | O | CR | 2.6 | 808 | 1.4 | 27 | 36.9 | 493 | 276 | | Inv. ex. |
| 63 | O | GI | 4.9 | 848 | 3.6 | 45 | 96.0 | 554 | 220 | | Inv. ex. |
| 64 | P | CR | 4.0 | 789 | 2.8 | 17 | 8.5 | 539 | 636 | | Inv. ex. |
| 65 | P | CR | 4.8 | 785 | 4.4 | 45 | 7.5 | 527 | 193 | | Inv. ex. |
| 66 | P | GA | 1.2 | 803 | 3.6 | 40 | 70.8 | 568 | 93 | 488 | Inv. ex. |
| 67 | Q | CR | 4.1 | 822 | 3.3 | 26 | 53.1 | 508 | 389 | | Inv. ex. |
| 68 | Q | CR | 2.9 | 831 | 8.2 | 25 | 54.1 | 537 | 441 | | Inv. ex. |
| 69 | R | EG | 6.6 | 813 | 4.2 | 50 | 55.0 | 513 | 195 | | Inv. ex. |
| 70 | R | CR | 2.5 | 749 | 4.0 | 25 | 38.8 | 389 | 95 | | Inv. ex. |
| 71 | R | CR | 2.1 | 776 | 1.6 | 14 | 43.8 | 454 | 442 | | Inv. ex. |
| 72 | R | GA | 2.4 | 782 | 1.7 | 35 | 40.6 | 447 | 581 | 555 | Inv. ex. |
| 73 | S | CR | 4.0 | 841 | 1.4 | 15 | 7.7 | 433 | 63 | | Inv. ex. |
| 74 | S | CR | 4.1 | 845 | 2.5 | 27 | 15.8 | 455 | 79 | | Inv. ex. |
| 75 | S | GI | 2.9 | 836 | 3.7 | 50 | 9.1 | 451 | 186 | | Inv. ex. |
| 76 | T | CR | 4.9 | 757 | 1.8 | 40 | 7.5 | 448 | 99 | | Inv. ex. |
| 77 | T | CR | 2.9 | 770 | 3.9 | 26 | 6.9 | 523 | 222 | | Inv. ex. |
| 78 | T | GI | 3.0 | 755 | 1.7 | 25 | 7.2 | 485 | 433 | | Inv. ex. |
| 79 | U | CR | 3.3 | 759 | 1.9 | 27 | 8.3 | 405 | 258 | | Inv. ex. |
| 80 | U | CR | 2.7 | 760 | 3.3 | 10 | 10.3 | 487 | 456 | | Inv. ex. |
| 81 | U | GI | 3.7 | 763 | 1.4 | 23 | 123.9 | 259 | 108 | | Inv. ex. |
| 82 | V | CR | 2.4 | 825 | 6.1 | 7 | 23.5 | 569 | 650 | | Inv. ex. |
| 83 | V | CR | 4.4 | 810 | 2.8 | 45 | 25.2 | 562 | 238 | | Inv. ex. |
| 84 | V | GI | 4.5 | 822 | 3.8 | 35 | 32.2 | 550 | 287 | | Inv. ex. |
| 85 | W | CR | 2.7 | 818 | 4.5 | 23 | 31.9 | 545 | 191 | | Inv. ex. |
| 86 | W | CR | 2.5 | 817 | 4.1 | 40 | 12.4 | 535 | 509 | | Inv. ex. |
| 87 | W | HR-GA | 3.2 | 779 | 2.5 | 40 | 12.2 | 480 | 302 | 484 | Inv. ex. |
| 88 | X | CR | 4.9 | 826 | 2.1 | 26 | 12.7 | 511 | 574 | | Inv. ex. |
| 89 | X | CR | 2.2 | 813 | 3.8 | 40 | 9.5 | 507 | 279 | | Inv. ex. |
| 90 | X | HR-GA | 3.2 | 908 | 3.1 | 22 | 11.1 | 526 | 268 | 512 | Inv. ex. |

TABLE 10

| Experiment | Chemical ingredients | Steel type | Heating process Heating rate °C./sec | Heating temp. °C. | First cooling process Average cooling rate °C./sec | Tension MPa | Second cooling process Average cooling rate °C./sec | Bs point °C. | Holding process Time sec | Alloying process Alloying temp. °C. | |
|---|---|---|---|---|---|---|---|---|---|---|---|
| 91 | Y | CR | 2.6 | 810 | 2.5 | 25 | 43.5 | 514 | 239 | | Inv. ex. |
| 92 | Y | CR | 3 | 833 | 6.0 | 40 | 35.0 | 521 | 376 | | Inv. ex. |
| 93 | Y | GA | 3.7 | 825 | 2.3 | 40 | 23.3 | 506 | 98 | 496 | Inv. ex. |
| 94 | Z | CR | 3.8 | 783 | 2.6 | 26 | 32.2 | 501 | 562 | | Inv. ex. |
| 95 | Z | CR | 2.8 | 797 | 3.0 | 9 | 40.7 | 512 | 290 | | Inv. ex. |
| 96 | Z | GA | 3.3 | 810 | 2.2 | 26 | 41.4 | 529 | 244 | 539 | Inv. ex. |
| 97 | AA | CR | 3.3 | 808 | 3.9 | 50 | 32.0 | 566 | 284 | | Comp. ex. |
| 98 | AB | CR | 2.4 | 849 | 1.7 | 40 | 29.4 | 595 | 300 | | Comp. ex. |

TABLE 10-continued

| Experiment | Chemical ingredients | Steel type | Heating process Heating rate °C./sec | Heating temp. °C. | First cooling process Average cooling rate °C./sec | Tension MPa | Second cooling process Average cooling rate °C./sec | Bs point °C. | Holding process Time sec | Alloying process Alloying temp. °C. | |
|---|---|---|---|---|---|---|---|---|---|---|---|
| 99 | AC | CR | 3.7 | 784 | 2.8 | 40 | 20.4 | 624 | 277 | | Comp. ex. |
| 100 | AD | CR | 3.2 | 858 | 2.3 | 35 | 31.7 | 682 | 304 | | Comp. ex. |
| 101 | AE | CR | 2.8 | 810 | 3.7 | 50 | 31.1 | 561 | 275 | | Comp. ex. |
| 102 | AF | — | — | — | — | — | — | — | — | | Comp. ex. |
| 103 | AG | CR | 2.9 | 799 | 2.2 | 13 | 36.9 | 410 | 67 | | Inv. ex. |
| 104 | AG | GA | 4.2 | 822 | 2.0 | 22 | 66.2 | 427 | 66 | 493 | Inv. ex. |
| 105 | AH | CR | 3.1 | 795 | 1.9 | 18 | 61.5 | 405 | 77 | | Inv. ex. |
| 106 | AH | EG | 4.1 | 814 | 2.7 | 19 | 70.0 | 430 | 100 | | Inv. ex. |
| 107 | AI | CR | 3.2 | 818 | 1.8 | 22 | 61.8 | 548 | 81 | | Inv. ex. |
| 108 | AI | GI | 3.9 | 806 | 2.5 | 16 | 52.5 | 545 | 69 | | Inv. ex. |
| 109 | AJ | CR | 3.5 | 830 | 1.9 | 21 | 42.9 | 546 | 74 | | Inv. ex. |
| 110 | AJ | GI | 4.1 | 819 | 2.1 | 21 | 35.2 | 546 | 83 | | Inv. ex. |
| 111 | AK | CR | 4.2 | 908 | 1.8 | 19 | 44.4 | 588 | 71 | | Inv. ex. |
| 112 | AK | GA | 4.1 | 914 | 2.2 | 13 | 35.5 | 572 | 93 | 563 | Inv. ex. |
| 113 | AL | CR | 4.4 | 792 | 1.6 | 38 | 54.2 | 472 | 73 | | Inv. ex. |
| 114 | AL | GA | 3.6 | 795 | 1.7 | 26 | 48.9 | 475 | 69 | 511 | Inv. ex. |

In the heating process, the steel sheets were heated by the average heating rates described in Table 7 to Table 10 in the interval from 550 to 700° C. until the the maximum heating temperatures described in Table 7 to Table 10.

After that, in the first cooling process from the maximum heating temperature to 700° C., the steel sheets were cooled by the average cooling rates described in Table 7 to Table 10. In the temperature region from the maximum heating temperature to 700° C., while applying the tensions which are described in Table 7 to Table 10, in Experiments 1 to 20, a radius 600 mm roll was used to bend the steel sheets six times by a maximum tensile strain of 0.0020. Similarly, in Experiments 21 to 39, a radius 450 mm roll was used to bend the steel sheets two times by a maximum tensile strain of 0.0055, in Experiments 41 to 75, a radius 730 mm roll was used to bend the steel sheets seven times by a maximum tensile strain of 0.0010, and in Experiments 76 to 114, a radius 500 mm roll was used to bend the steel sheets five times by a maximum tensile strain of a 0.0040. The thickness of the steel sheet at the time of bending was 1.2 mm in Experiments 1 to 20, 2.5 mm in Experiments 21 to 39, 0.7 mm in Experiments 41 to 75, and 2.0 mm in Experiments 76 to 114.

In the second cooling process from 700° C. to 500° C. or the Bs point, the steel sheets were cooled by the average cooling rates described in Table 7 to Table 10, then were further cooled from 250 to 500° C. in range, were held for exactly the times described in Table 7 to Table 10, then were cooled to room temperature.

After cooling down to room temperature, in Experiments 6 to 20 and 70 to 114, the steel sheets were cold rolled by 0.15%, in Experiment 22, the steel sheet was cold rolled by 1.50%, in Experiment 28, the steel sheet was cold rolled by 1.00%, and in Experiments 31 to 54, the steel sheet was cold rolled at 0.25%.

Experiments 29, 33, 43, 60, and 69 are examples in which the steel sheets are electrolyticaly plated after the annealing process to obtain galvanized steel sheets (EG).

Experiments 13, 54, 57, 63, 75, and 78 are examples in which the steel sheets are cooled down to 500° C. or the Bs point in the second cooling process, then are held at 250 to 500° C. in range during which they are dipped in a galvanization bath to obtain hot dip galvanized steel sheets (GI).

Experiments 18, 21, 81, and 84 are examples in which the steel sheets are held at 250 to 500° C. in range, then dipped in a galvanization bath, then cooled down to room temperature to obtain hot dip galvanized steel sheets (GI).

Experiments 3, 8, 14, 25, 93, and 96 are examples in which the steel sheets are cooled down to 500° C. or the Bs point in the second cooling process, then are held at 250 to 500° C. in range during which they are dipped in a galvanization bath and are further treated for alloying at the described temperatures to obtain hot dip galvannealed steel sheets (GA).

Experiments 38, 48, 51, 66, 72, 87, and 90 are examples in which after the holding treatment at 250 to 500° C. in range, the steel sheets are dipped in a galvanization bath and treated for alloying at the described temperatures to obtain hot dipped galvannealed steel sheets (GA). Experiments 38 and 72 are examples in which the surfaces of the plating layers are given films comprised of P-based composite oxides.

Table 11 to Table 14 give the results of measurement of the fractions of the microstructures of the steel sheets of Experiments 1 to 114 in the range of ⅛ thickness to ⅜ thickness. In the microstructure fractions, the amounts of residual austenite (residual γ) were measured by X-ray diffraction. The rest were found by cutting out sheet thickness cross-sections parallel to the rolling direction, polishing them to mirror surfaces, etching the cross-sections by Nital, then examining them using a field emission scanning electron microscope (FE-SEM).

TABLE 11

| Experiment | Chemical ingredients | Steel type | Microstructure observation results Volume fraction | | | | | | | |
|---|---|---|---|---|---|---|---|---|---|---|
| | | | F % | B % | BF % | TM % | M % | Residual γ % | Others % | |
| 1 | A | CR | 27 | 16 | 20 | 31 | 2 | 4 | 0 | Inv. ex. |
| 2 | A | CR | 28 | 18 | 27 | 21 | 1 | 5 | 0 | Inv. ex. |
| 3 | A | GA | 12 | 25 | 23 | 32 | 1 | 6 | 1 | Inv. ex. |
| 4 | A | HR | 46 | 15 | 11 | 22 | 0 | 6 | 0 | Inv. ex. |
| 5 | A | CR | 33 | 21 | 18 | 19 | 2 | 6 | 1 | Comp. ex. |
| 6 | B | CR | 32 | 24 | 16 | 23 | 0 | 4 | 1 | Inv. ex. |
| 7 | B | CR | 14 | 30 | 23 | 26 | 0 | 5 | 2 | Inv. ex. |
| 8 | B | GA | 37 | 18 | 12 | 28 | 0 | 5 | 0 | Inv. ex. |
| 9 | B | HR | 37 | 19 | 15 | 24 | 1 | 4 | 0 | Inv. ex. |
| 10 | B | CR | 25 | 22 | 18 | 26 | 2 | 6 | 1 | Comp. ex. |
| 11 | C | CR | 23 | 18 | 16 | 30 | 0 | 11 | 2 | Inv. ex. |
| 12 | C | CR | 21 | 23 | 23 | 23 | 0 | 10 | 0 | Inv. ex. |
| 13 | C | GI | 15 | 31 | 18 | 28 | 0 | 7 | 1 | Inv. ex. |
| 14 | C | HR-GA | 19 | 25 | 23 | 23 | 0 | 10 | 0 | Inv. ex. |
| 15 | C | CR | 33 | 9 | 19 | 27 | 1 | 11 | 0 | Comp. ex. |
| 16 | D | CR | 52 | 16 | 7 | 15 | 0 | 9 | 1 | Inv. ex. |
| 17 | D | CR | 21 | 31 | 14 | 21 | 1 | 10 | 2 | Inv. ex. |
| 18 | D | GI | 33 | 24 | 17 | 19 | 0 | 7 | 0 | Inv. ex. |
| 19 | D | HR | 15 | 29 | 34 | 12 | 0 | 8 | 2 | Inv. ex. |
| 20 | D | CR | 78 | 0 | 0 | 0 | 0 | 5 | 17 | Comp. ex. |
| 21 | E | GI | 40 | 5 | 23 | 22 | 1 | 9 | 0 | Inv. ex. |
| 22 | E | CR | 64 | 7 | 14 | 6 | 0 | 9 | 0 | Inv. ex. |
| 23 | E | CR | 23 | 19 | 28 | 19 | 0 | 11 | 0 | Comp.ex. |
| 24 | E | CR | 45 | 17 | 15 | 12 | 1 | 10 | 0 | Inv. ex. |
| 25 | E | HR-GA | 59 | 4 | 15 | 11 | 0 | 9 | 2 | Inv. ex. |
| 26 | F | CR | 50 | 31 | 7 | 8 | 0 | 4 | 0 | Inv. ex. |
| 27 | F | HR | 23 | 43 | 18 | 15 | 1 | 0 | 0 | Inv. ex. |
| 28 | F | CR | 15 | 41 | 6 | 35 | 2 | 1 | 0 | Inv. ex. |
| 29 | F | EG | 43 | 19 | 12 | 17 | 0 | 8 | 1 | Inv. ex. |
| 30 | F | CR | 0 | 48 | 25 | 22 | 0 | 5 | 0 | Comp. ex. |

TABLE 12

| Experiment | Chemical ingredients | Steel type | Microstructure observation results Volume fraction | | | | | | | |
|---|---|---|---|---|---|---|---|---|---|---|
| | | | F % | B % | BF % | TM % | M % | Residual γ % | Others % | |
| 31 | G | CR | 57 | 14 | 7 | 18 | 1 | 2 | 1 | Inv. ex. |
| 32 | G | CR | 46 | 21 | 9 | 21 | 0 | 3 | 0 | Inv. ex. |
| 33 | G | EG | 33 | 34 | 17 | 15 | 0 | 0 | 1 | Inv. ex. |
| 34 | G | CR | 67 | 14 | 2 | 6 | 0 | 3 | 8 | Comp. ex. |
| 35 | G | CR | 23 | 38 | 14 | 20 | 2 | 2 | 1 | Comp. ex. |
| 36 | H | CR | 66 | 0 | 8 | 16 | 0 | 10 | 0 | Inv. ex. |
| 37 | H | CR | 53 | 8 | 16 | 13 | 0 | 9 | 1 | Inv. ex. |
| 38 | H | GA | 63 | 4 | 9 | 15 | 1 | 8 | 0 | Inv. ex. |
| 39 | H | CR | 50 | 31 | 5 | 0 | 3 | 4 | 7 | Comp. ex. |
| 40 | H | CR | 48 | 15 | 12 | 11 | 1 | 11 | 2 | Comp. ex. |
| 41 | I | CR | 20 | 45 | 12 | 21 | 2 | 0 | 0 | Inv. ex. |
| 42 | I | CR | 32 | 27 | 13 | 25 | 0 | 3 | 0 | Inv. ex. |
| 43 | I | EG | 24 | 29 | 13 | 29 | 1 | 3 | 1 | Inv. ex. |
| 44 | I | CR | 33 | 36 | 9 | 13 | 0 | 2 | 7 | Comp. ex. |
| 45 | I | CR | 45 | 10 | 6 | 12 | 22 | 5 | 0 | Comp. ex. |
| 46 | J | CR | 17 | 26 | 15 | 36 | 0 | 6 | 0 | Inv. ex. |
| 47 | J | CR | 9 | 41 | 22 | 22 | 0 | 5 | 1 | Inv. ex. |
| 48 | J | GA | 41 | 17 | 10 | 25 | 0 | 6 | 1 | Inv. ex. |
| 49 | K | CR | 27 | 23 | 14 | 24 | 2 | 10 | 0 | Inv. ex. |
| 50 | K | CR | 23 | 31 | 6 | 28 | 1 | 11 | 0 | Inv. ex. |
| 51 | K | GA | 16 | 35 | 13 | 32 | 0 | 4 | 0 | Inv. ex. |
| 52 | L | CR | 15 | 36 | 17 | 27 | 0 | 2 | 3 | Inv. ex. |
| 53 | L | CR | 10 | 28 | 13 | 44 | 0 | 4 | 1 | Inv. ex. |
| 54 | L | GI | 36 | 32 | 10 | 19 | 1 | 1 | 1 | Inv. ex. |
| 55 | M | CR | 48 | 2 | 14 | 20 | 0 | 15 | 1 | Inv. ex. |
| 56 | M | CR | 11 | 19 | 32 | 20 | 2 | 15 | 1 | Inv. ex. |
| 57 | M | GI | 15 | 0 | 21 | 44 | 0 | 20 | 0 | Inv. ex. |
| 58 | N | CR | 36 | 8 | 25 | 15 | 1 | 14 | 1 | Inv. ex. |
| 59 | N | CR | 24 | 23 | 27 | 9 | 1 | 15 | 1 | Inv. ex. |
| 60 | N | EG | 36 | 0 | 9 | 45 | 1 | 7 | 2 | Inv. ex. |

TABLE 13

| Experiment | Chemical ingredients | Steel type | Microstructure observation results Volume fraction | | | | | | | |
|---|---|---|---|---|---|---|---|---|---|---|
| | | | F % | B % | BF % | TM % | M % | Residual γ % | Others % | |
| 61 | O | CR | 51 | 21 | 7 | 16 | 1 | 4 | 0 | Inv. ex. |
| 62 | O | CR | 73 | 9 | 4 | 11 | 0 | 3 | 0 | Inv. ex. |
| 63 | O | GI | 21 | 27 | 19 | 31 | 0 | 2 | 0 | Inv. ex. |
| 64 | P | CR | 38 | 20 | 10 | 22 | 0 | 9 | 1 | Inv. ex. |
| 65 | P | CR | 41 | 20 | 9 | 20 | 0 | 8 | 2 | Inv. ex. |
| 66 | P | GA | 17 | 19 | 9 | 46 | 0 | 9 | 0 | Inv. ex. |
| 67 | Q | CR | 34 | 11 | 21 | 26 | 0 | 8 | 0 | Inv. ex. |
| 68 | Q | CR | 13 | 22 | 32 | 26 | 0 | 7 | 0 | Inv. ex. |
| 69 | Q | EG | 39 | 7 | 15 | 23 | 2 | 11 | 3 | Inv. ex. |
| 70 | R | CR | 71 | 0 | 5 | 13 | 1 | 10 | 0 | Inv. ex. |
| 71 | R | CR | 49 | 9 | 11 | 25 | 1 | 5 | 0 | Inv. ex. |
| 72 | R | GA | 53 | 17 | 10 | 14 | 0 | 6 | 0 | Inv. ex. |
| 73 | S | CR | 56 | 5 | 9 | 23 | 0 | 7 | 0 | Inv. ex. |
| 74 | S | CR | 45 | 6 | 18 | 23 | 0 | 7 | 1 | Inv. ex. |
| 75 | S | GI | 39 | 10 | 23 | 21 | 0 | 7 | 0 | Inv. ex. |
| 76 | T | CR | 63 | 8 | 5 | 15 | 0 | 9 | 0 | Inv. ex. |
| 77 | T | CR | 21 | 24 | 17 | 30 | 0 | 7 | 1 | Inv. ex. |
| 78 | T | GI | 58 | 9 | 5 | 17 | 0 | 10 | 1 | Inv. ex. |
| 79 | U | CR | 71 | 21 | 2 | 0 | 3 | 3 | 0 | Inv. ex. |
| 80 | U | CR | 47 | 23 | 12 | 16 | 0 | 0 | 2 | Inv. ex. |
| 81 | U | GI | 74 | 13 | 0 | 9 | 2 | 2 | 0 | Inv. ex. |
| 82 | V | CR | 18 | 26 | 23 | 18 | 2 | 12 | 1 | Inv. ex. |
| 83 | V | CR | 32 | 9 | 20 | 24 | 0 | 14 | 1 | Inv. ex. |
| 84 | V | GI | 34 | 23 | 23 | 11 | 0 | 9 | 0 | Inv. ex. |
| 85 | W | CR | 13 | 36 | 26 | 19 | 0 | 6 | 0 | Inv. ex. |
| 86 | W | CR | 25 | 23 | 14 | 29 | 0 | 9 | 0 | Inv. ex. |
| 87 | W | HR-GA | 65 | 4 | 8 | 16 | 1 | 6 | 0 | Inv. ex. |
| 88 | X | CR | 40 | 20 | 14 | 19 | 3 | 3 | 1 | Inv. ex. |
| 89 | X | CR | 44 | 7 | 0 | 45 | 2 | 2 | 0 | Inv. ex. |
| 90 | X | HR-GA | 15 | 32 | 19 | 28 | 0 | 6 | 0 | Inv. ex. |

TABLE 14

| Experiment | Chemical ingredients | Steel type | Microstructure observation results Volume fraction | | | | | | | |
|---|---|---|---|---|---|---|---|---|---|---|
| | | | F % | B % | BF % | TM % | M % | Residual γ % | Others % | |
| 91 | Y | CR | 35 | 8 | 21 | 24 | 2 | 10 | 0 | Inv. ex. |
| 92 | Y | CR | 10 | 19 | 35 | 25 | 0 | 11 | 0 | Inv. ex. |
| 93 | Y | GA | 41 | 5 | 29 | 16 | 0 | 8 | 1 | Inv. ex. |
| 94 | Z | CR | 54 | 18 | 12 | 10 | 0 | 6 | 0 | Inv. ex. |
| 95 | Z | CR | 25 | 31 | 15 | 20 | 1 | 7 | 1 | Inv. ex. |
| 96 | Z | GA | 25 | 32 | 21 | 16 | 0 | 5 | 1 | Inv. ex. |
| 97 | AA | CR | 38 | 16 | 21 | 16 | 1 | 8 | 0 | Comp. ex. |
| 98 | AB | CR | 93 | 0 | 4 | 0 | 0 | 0 | 3 | Comp. ex. |
| 99 | AC | CR | 20 | 46 | 3 | 22 | 0 | 2 | 7 | Comp. ex. |
| 100 | AD | CR | 30 | 27 | 25 | 5 | 1 | 0 | 12 | Comp. ex. |
| 101 | AE | CR | 37 | 25 | 15 | 13 | 0 | 10 | 0 | Comp. ex. |
| 102 | AF | — | — | — | — | — | — | — | — | Comp. ex. |
| 103 | AG | CR | 47 | 11 | 18 | 12 | 3 | 8 | 1 | Inv. ex. |
| 104 | AG | GA | 35 | 3 | 52 | 5 | 0 | 5 | 0 | Inv. ex. |
| 105 | AH | CR | 36 | 11 | 34 | 7 | 0 | 12 | 0 | Inv. ex. |
| 106 | AH | EG | 13 | 4 | 34 | 32 | 2 | 15 | 0 | Inv. ex. |
| 107 | AI | CR | 20 | 16 | 33 | 27 | 0 | 3 | 1 | Inv. ex. |
| 108 | AI | GI | 27 | 18 | 37 | 14 | 0 | 1 | 3 | Inv. ex. |
| 109 | AJ | CR | 57 | 10 | 25 | 1 | 3 | 4 | 0 | Inv. ex. |
| 110 | AJ | GI | 57 | 0 | 21 | 15 | 0 | 7 | 0 | Inv. ex. |
| 111 | AK | CR | 39 | 6 | 33 | 9 | 2 | 10 | 1 | Inv. ex. |
| 112 | AK | GA | 51 | 7 | 14 | 18 | 1 | 9 | 0 | Inv. ex. |
| 113 | AL | CR | 27 | 51 | 8 | 12 | 0 | 0 | 2 | Inv. ex. |
| 114 | AL | GA | 24 | 35 | 10 | 28 | 1 | 2 | 0 | Inv. ex. |

Table 15 to Table 18 show the results of observation of the Cu precipitates.

Samples cut out from the steel sheets at ¼ thickness were observed for Cu precipitates using a high resolution transmission electron microscope (HRTEM). Electron energy-loss spectroscopy (EELS) was used to confirm the composition of the Cu particles. These were investigated for particle size and coherence with the bcc iron. The size of the particles was made the average of the particle sizes of 25 particles. Further, the ratio of the precipitates which are incoherent with the bcc iron in the number of particles which were observed was found.

In these experiments, there were no test pieces with average sizes of precipitates of 3 nm or less, so it was assumed the average particle size was 3 nm or more, the number of Cu particles in a 10000 $nm^2$ to 1 $\mu m^2$ field was measured, convergent-beam electron diffraction (CBED) was used to measure the thickness of the observed part of the test piece, this was multiplied with the observed area to find the observed volume, and the number of Cu particles was divided by the observed volume to find the Cu particle density.

TABLE 15

| Experiment | Chemical ingredients | Steel type | Cu particles Density No./$m^3$ | Average size nm | Ratio of incoherent particles % | |
|---|---|---|---|---|---|---|
| 1 | A | CR | $9.9 \times 10^{18}$ | 7.6 | 36 | Inv. ex. |
| 2 | A | CR | $1.5 \times 10^{19}$ | 6.2 | 28 | Inv. ex. |
| 3 | A | GA | $7.0 \times 10^{18}$ | 7.2 | 24 | Inv. ex. |
| 4 | A | HR | $1.6 \times 10^{19}$ | 7.0 | 48 | Inv. ex. |
| 5 | A | CR | $1.6 \times 10^{20}$ | 7.0 | 68 | Comp. ex. |
| 6 | B | CR | $1.6 \times 10^{21}$ | 6.3 | 96 | Inv. ex. |
| 7 | B | CR | $1.3 \times 10^{19}$ | 7.7 | 100 | Inv. ex. |
| 8 | B | GA | $1.3 \times 10^{19}$ | 7.8 | 52 | Inv. ex. |
| 9 | B | HR | $1.1 \times 10^{19}$ | 4.6 | 80 | Inv. ex. |
| 10 | B | CR | $4.2 \times 10^{21}$ | 2.4 | 0 | Comp. ex. |
| 11 | C | CR | $5.5 \times 10^{18}$ | 8.2 | 72 | Inv. ex. |
| 12 | C | CR | $4.6 \times 10^{18}$ | 5.8 | 24 | Inv. ex. |
| 13 | C | GI | $5.7 \times 10^{18}$ | 5.5 | 24 | Inv. ex. |
| 14 | C | HR-GA | $1.5 \times 10^{19}$ | 4.2 | 88 | Inv. ex. |
| 15 | C | CR | $2.2 \times 10^{22}$ | 1.6 | 4 | Comp. ex. |
| 16 | D | CR | $1.2 \times 10^{20}$ | 5.2 | 36 | Inv. ex. |
| 17 | D | CR | $6.2 \times 10^{19}$ | 5.7 | 100 | Inv. ex. |
| 18 | D | GI | $3.7 \times 10^{19}$ | 6.2 | 28 | Inv. ex. |
| 19 | D | HR | $7.4 \times 10^{19}$ | 6.6 | 40 | Inv. ex. |
| 20 | D | CR | $3.2 \times 10^{19}$ | 4.9 | 100 | Comp. ex. |
| 21 | E | GI | $1.7 \times 10^{18}$ | 5.1 | 24 | Inv. ex. |
| 22 | E | CR | $1.6 \times 10^{18}$ | 4.8 | 64 | Inv. ex. |
| 23 | E | CR | $1.9 \times 10^{18}$ | 2.7 | 4 | Comp. ex. |
| 24 | E | CR | $5.1 \times 10^{18}$ | 4.7 | 84 | Inv. ex. |
| 25 | E | HR-GA | $1.1 \times 10^{18}$ | 5.6 | 88 | Inv. ex. |
| 26 | F | CR | $1.5 \times 10^{19}$ | 3.6 | 40 | Inv. ex. |
| 27 | F | HR | $5.6 \times 10^{18}$ | 5.6 | 44 | Inv. ex. |
| 28 | F | CR | $5.7 \times 10^{18}$ | 5.8 | 72 | Inv. ex. |
| 29 | F | EG | $5.9 \times 10^{18}$ | 6.2 | 96 | Inv. ex. |
| 30 | F | CR | $6.2 \times 10^{18}$ | 1.5 | 8 | Comp. ex. |

TABLE 16

| Experiment | Chemical ingredients | Steel type | Cu particles Density No./m³ | Average size nm | Ratio of incoherent particles % | |
|---|---|---|---|---|---|---|
| 31 | G | CR | $1.1 \times 10^{19}$ | 6.8 | 40 | Inv. ex. |
| 32 | G | CR | $1.6 \times 10^{19}$ | 4.8 | 20 | Inv. ex. |
| 33 | G | EG | $2.0 \times 10^{19}$ | 4.5 | 28 | Inv. ex. |
| 34 | G | CR | $3.7 \times 10^{18}$ | 11.8 | 100 | Comp. ex. |
| 35 | G | CR | $3.9 \times 10^{17}$ | 5.5 | 24 | Comp. ex. |
| 36 | H | CR | $2.8 \times 10^{19}$ | 4.9 | 56 | Inv. ex. |
| 37 | H | CR | $9.0 \times 10^{19}$ | 3.4 | 32 | Inv. ex. |
| 38 | H | GA | $1.8 \times 10^{19}$ | 4.3 | 80 | Inv. ex. |
| 39 | H | CR | $2.7 \times 10^{18}$ | 7.7 | 28 | Comp. ex. |
| 40 | H | CR | $2.5 \times 10^{17}$ | 12.6 | 100 | Comp. ex. |
| 41 | I | CR | $5.7 \times 10^{18}$ | 5.0 | 32 | Inv. ex. |
| 42 | I | CR | $2.5 \times 10^{18}$ | 6.3 | 40 | Inv. ex. |
| 43 | I | EG | $3.8 \times 10^{19}$ | 4.8 | 84 | Inv. ex. |
| 44 | I | CR | $8.9 \times 10^{17}$ | 8.5 | 44 | Comp. ex. |
| 45 | I | CR | $1.0 \times 10^{19}$ | 4.2 | 32 | Comp. ex. |
| 46 | J | CR | $1.5 \times 10^{19}$ | 3.4 | 20 | Inv. ex. |
| 47 | J | CR | $2.7 \times 10^{18}$ | 4.8 | 64 | Inv. ex. |
| 48 | J | GA | $1.2 \times 10^{18}$ | 3.9 | 36 | Inv. ex. |
| 49 | K | CR | $1.5 \times 10^{20}$ | 5.9 | 76 | Inv. ex. |
| 50 | K | CR | $5.4 \times 10^{19}$ | 6.9 | 44 | Inv. ex. |
| 51 | K | GA | $6.8 \times 10^{19}$ | 6.5 | 84 | Inv. ex. |
| 52 | L | CR | $3.7 \times 10^{19}$ | 7.5 | 52 | Inv. ex. |
| 53 | L | CR | $9.4 \times 10^{19}$ | 4.1 | 60 | Inv. ex. |
| 54 | L | GI | $3.0 \times 10^{19}$ | 8.2 | 64 | Inv. ex. |
| 55 | M | CR | $1.4 \times 10^{19}$ | 6.0 | 48 | Inv. ex. |
| 56 | M | CR | $7.1 \times 10^{19}$ | 6.0 | 40 | Inv. ex. |
| 57 | M | GI | $1.3 \times 10^{20}$ | 5.2 | 36 | Inv. ex. |
| 58 | N | CR | $4.9 \times 10^{19}$ | 6.8 | 88 | Inv. ex. |
| 59 | N | CR | $1.0 \times 10^{20}$ | 6.6 | 32 | Inv. ex. |
| 60 | N | EG | $1.5 \times 10^{19}$ | 5.4 | 60 | Inv. ex. |

TABLE 17

| Experiment | Chemical ingredients | Steel type | Cu particles Density No./m³ | Average size nm | Ratio of incoherent particles % | |
|---|---|---|---|---|---|---|
| 61 | O | CR | $2.0 \times 10^{20}$ | 6.6 | 96 | Inv. ex. |
| 62 | O | CR | $9.5 \times 10^{19}$ | 7.6 | 92 | Inv. ex. |
| 63 | O | GI | $1.1 \times 10^{21}$ | 5.0 | 68 | Inv. ex. |
| 64 | P | CR | $3.0 \times 10^{18}$ | 7.3 | 60 | Inv. ex. |
| 65 | P | CR | $5.1 \times 10^{18}$ | 5.6 | 76 | Inv. ex. |
| 66 | P | GA | $5.3 \times 10^{18}$ | 4.4 | 44 | Inv. ex. |
| 67 | Q | CR | $1.0 \times 10^{20}$ | 7.0 | 40 | Inv. ex. |
| 68 | Q | CR | $1.9 \times 10^{20}$ | 5.7 | 72 | Inv. ex. |
| 69 | Q | EG | $5.5 \times 10^{20}$ | 4.5 | 56 | Inv. ex. |
| 70 | R | CR | $7.1 \times 10^{19}$ | 4.8 | 44 | Inv. ex. |
| 71 | R | CR | $2.6 \times 10^{19}$ | 5.4 | 72 | Inv. ex. |
| 72 | R | GA | $1.7 \times 10^{20}$ | 6.5 | 56 | Inv. ex. |
| 73 | S | CR | $2.6 \times 10^{19}$ | 6.1 | 36 | Inv. ex. |
| 74 | S | CR | $5.7 \times 10^{19}$ | 6.0 | 96 | Inv. ex. |
| 75 | S | GI | $1.8 \times 10^{19}$ | 7.1 | 48 | Inv. ex. |
| 76 | T | CR | $3.6 \times 10^{20}$ | 6.2 | 28 | Inv. ex. |
| 77 | T | CR | $1.1 \times 10^{20}$ | 9.9 | 88 | Inv. ex. |
| 78 | T | GI | $1.8 \times 10^{20}$ | 13.9 | 100 | Inv. ex. |
| 79 | U | CR | $3.6 \times 10^{19}$ | 7.2 | 76 | Inv. ex. |
| 80 | U | CR | $1.7 \times 10^{20}$ | 4.7 | 68 | Inv. ex. |
| 81 | U | GI | $2.3 \times 10^{20}$ | 3.2 | 24 | Inv. ex. |
| 82 | V | CR | $9.4 \times 10^{18}$ | 3.6 | 64 | Inv. ex. |
| 83 | V | CR | $3.3 \times 10^{19}$ | 3.2 | 68 | Inv. ex. |
| 84 | V | GI | $2.4 \times 10^{19}$ | 3.4 | 40 | Inv. ex. |
| 85 | W | CR | $3.3 \times 10^{20}$ | 3.4 | 28 | Inv. ex. |
| 86 | W | CR | $1.7 \times 10^{20}$ | 4.8 | 76 | Inv. ex. |
| 87 | W | HR-GA | $4.6 \times 10^{20}$ | 4.3 | 72 | Inv. ex. |
| 88 | X | CR | $2.6 \times 10^{19}$ | 3.9 | 28 | Inv. ex. |
| 89 | X | CR | $2.1 \times 10^{20}$ | 4.5 | 60 | Inv. ex. |
| 90 | X | HR-GA | $6.8 \times 10^{18}$ | 3.8 | 56 | Inv. ex. |

TABLE 18

| Experiment | Chemical ingredients | Steel type | Cu particles Density No./m³ | Average size nm | Ratio of incoherent particles % | |
|---|---|---|---|---|---|---|
| 91 | Y | CR | $1.8 \times 10^{20}$ | 3.6 | 48 | Inv. ex. |
| 92 | Y | CR | $2.0 \times 10^{20}$ | 3.9 | 80 | Inv. ex. |
| 93 | Y | GA | $1.0 \times 10^{21}$ | 3.5 | 48 | Inv. ex. |
| 94 | Z | CR | $1.3 \times 10^{20}$ | 4.1 | 100 | Inv. ex. |
| 95 | Z | CR | $2.9 \times 10^{20}$ | 3.7 | 36 | Inv. ex. |
| 96 | Z | GA | $6.5 \times 10^{19}$ | 3.6 | 36 | Inv. ex. |
| 97 | AA | CR | 0 | — | — | Comp. ex. |
| 98 | AB | CR | $3.5 \times 10^{19}$ | 3.6 | 20 | Comp. ex. |
| 99 | AC | CR | $9.4 \times 10^{19}$ | 3.3 | 96 | Comp. ex. |
| 100 | AD | CR | $3.5 \times 10^{19}$ | 3.6 | 32 | Comp. ex. |
| 101 | AE | CR | $2.3 \times 10^{16}$ | 4.5 | 44 | Comp. ex. |
| 102 | AF | — | — | — | — | Comp. ex. |
| 103 | AG | CR | $2.0 \times 10^{20}$ | 4.3 | 52 | Inv. ex. |
| 104 | AG | GA | $2.4 \times 10^{20}$ | 3.7 | 40 | Inv. ex. |
| 105 | AH | CR | $3.2 \times 10^{19}$ | 3.9 | 36 | Inv. ex. |
| 106 | AH | EG | $6.4 \times 10^{19}$ | 3.5 | 60 | Inv. ex. |
| 107 | AI | CR | $1.0 \times 10^{20}$ | 3.4 | 24 | Inv. ex. |
| 108 | AI | GI | $9.5 \times 10^{19}$ | 3.7 | 84 | Inv. ex. |
| 109 | AJ | CR | $1.5 \times 10^{21}$ | 4.9 | 68 | Inv. ex. |
| 110 | AJ | GI | $1.0 \times 10^{21}$ | 4.6 | 36 | Inv. ex. |
| 111 | AK | CR | $1.9 \times 10^{21}$ | 4.0 | 72 | Inv. ex. |
| 112 | AK | GA | $1.7 \times 10^{21}$ | 4.8 | 52 | Inv. ex. |
| 113 | AL | CR | $2.3 \times 10^{21}$ | 3.9 | 52 | Inv. ex. |
| 114 | AL | GA | $2.5 \times 10^{21}$ | 4.1 | 28 | Inv. ex. |

Table 19 to Table 22 show the results of evaluation of properties of the steel sheets of Experiments 1 to 114. Tensile test pieces based on JIS Z 2201 were taken from the steel sheets of Experiments 1 to 114 and were subjected to tensile tests based on JIS Z 2241 to measure the yield strength (YS), tensile strength (TS), total elongation (EL), and hold expansion rate (λ).

TABLE 19

| | | | Material measurement results | | | | TS × EL | TS × λ | |
|---|---|---|---|---|---|---|---|---|---|
| Experiment | Chemical ingredients | Steel type | YS MPa | TS MPa | EL % | λ % | MPa·% | MPa·% | |
| 1 | A | CR | 733 | 935 | 21 | 42 | 19635 | 39270 | Inv. ex. |
| 2 | A | CR | 668 | 947 | 19 | 53 | 17993 | 50191 | Inv. ex. |
| 3 | A | GA | 911 | 1080 | 18 | 37 | 19440 | 39960 | Inv. ex. |

TABLE 19-continued

| Experiment | Chemical ingredients | Steel type | Material measurement results YS MPa | TS MPa | EL % | λ % | TS × EL MPa•% | TS × λ MPa•% | |
|---|---|---|---|---|---|---|---|---|---|
| 4 | A | HR | 694 | 1054 | 18 | 51 | 18972 | 53754 | Inv. ex. |
| 5 | A | CR | 693 | 974 | 9 | 15 | 8766 | 14610 | Comp. ex. |
| 6 | B | CR | 686 | 968 | 18 | 42 | 17424 | 40656 | Inv. ex. |
| 7 | B | CR | 889 | 1058 | 20 | 43 | 21160 | 45494 | Inv. ex. |
| 8 | B | GA | 707 | 1026 | 20 | 39 | 20520 | 40014 | Inv. ex. |
| 9 | B | HR | 715 | 985 | 18 | 58 | 17730 | 57130 | Inv. ex. |
| 10 | B | CR | 831 | 1098 | 17 | 23 | 18666 | 25254 | Comp. ex. |
| 11 | C | CR | 843 | 1086 | 16 | 42 | 17376 | 45612 | Inv. ex. |
| 12 | C | CR | 952 | 1253 | 16 | 52 | 20048 | 65156 | Inv. ex. |
| 13 | C | GI | 866 | 1067 | 19 | 64 | 20273 | 68288 | Inv. ex. |
| 14 | C | HR-GA | 926 | 1174 | 15 | 35 | 17610 | 41090 | Inv. ex. |
| 15 | C | CR | 857 | 1142 | 15 | 19 | 17130 | 21698 | Comp. ex. |
| 16 | D | CR | 840 | 1523 | 12 | 43 | 18276 | 65489 | Inv. ex. |
| 17 | D | CR | 988 | 1329 | 14 | 38 | 18606 | 50502 | Inv. ex. |
| 18 | D | GI | 1110 | 1551 | 12 | 35 | 18612 | 54285 | Inv. ex. |
| 19 | D | HR | 1098 | 1410 | 13 | 46 | 18330 | 64860 | Inv. ex. |
| 20 | D | CR | 554 | 772 | 3 | 9 | 2316 | 6948 | Comp. ex. |
| 21 | E | GI | 699 | 1099 | 18 | 69 | 19782 | 75831 | Inv. ex. |
| 22 | E | CR | 563 | 1125 | 18 | 51 | 20250 | 57375 | Inv. ex. |
| 23 | E | CR | 886 | 1185 | 15 | 16 | 17775 | 18960 | Comp. ex. |
| 24 | E | CR | 672 | 1093 | 17 | 43 | 18581 | 46999 | Inv. ex. |
| 25 | E | HR-GA | 569 | 1105 | 19 | 39 | 20995 | 43095 | Inv. ex. |
| 26 | F | CR | 783 | 1343 | 14 | 30 | 18802 | 40290 | Inv. ex. |
| 27 | F | HR | 923 | 1284 | 13 | 47 | 16692 | 60348 | Inv. ex. |
| 28 | F | CR | 1026 | 1179 | 14 | 38 | 16506 | 44802 | Inv. ex. |
| 29 | F | EG | 732 | 1165 | 16 | 50 | 18640 | 58250 | Inv. ex. |
| 30 | F | CR | 1168 | 1344 | 9 | 2 | 12096 | 2688 | Comp. ex. |

TABLE 20

| Experiment | Chemical ingredients | Steel type | Material measurement results YS MPa | TS MPa | EL % | λ % | TS × EL MPa•% | TS × λ MPa•% | |
|---|---|---|---|---|---|---|---|---|---|
| 31 | G | CR | 552 | 1075 | 17 | 52 | 18275 | 55900 | Inv. ex. |
| 32 | G | CR | 699 | 1098 | 18 | 44 | 19764 | 48312 | Inv. ex. |
| 33 | G | EG | 828 | 1182 | 14 | 37 | 16548 | 43734 | Inv. ex. |
| 34 | G | CR | 452 | 1007 | 14 | 24 | 14098 | 24168 | Comp. ex. |
| 35 | G | CR | 823 | 1092 | 18 | 19 | 19656 | 20748 | Comp. ex. |
| 36 | H | CR | 643 | 1305 | 15 | 37 | 19575 | 48285 | Inv. ex. |
| 37 | H | CR | 733 | 1307 | 14 | 35 | 18298 | 45745 | Inv. ex. |
| 38 | H | GA | 682 | 1320 | 13 | 40 | 17160 | 52800 | Inv. ex. |
| 39 | H | CR | 649 | 1055 | 15 | 10 | 15825 | 10550 | Comp. ex. |
| 40 | H | CR | 717 | 1197 | 14 | 22 | 16758 | 26334 | Comp. ex. |
| 41 | I | CR | 885 | 1184 | 17 | 39 | 20128 | 46176 | Inv. ex. |
| 42 | I | CR | 876 | 1218 | 16 | 38 | 19488 | 46284 | Inv. ex. |
| 43 | I | EG | 909 | 1169 | 15 | 52 | 17535 | 60788 | Inv. ex. |
| 44 | I | CR | 721 | 1080 | 11 | 15 | 11880 | 16200 | Comp. ex. |
| 45 | I | CR | 675 | 1369 | 12 | 3 | 16428 | 4107 | Comp. ex. |
| 46 | J | CR | 879 | 1047 | 17 | 42 | 17799 | 43974 | Inv. ex. |
| 47 | J | CR | 930 | 1075 | 18 | 39 | 19350 | 41925 | Inv. ex. |
| 48 | J | GA | 676 | 984 | 20 | 47 | 19680 | 46248 | Inv. ex. |
| 49 | K | CR | 963 | 1275 | 15 | 42 | 19125 | 53550 | Inv. ex. |
| 50 | K | CR | 1303 | 1672 | 10 | 28 | 16720 | 46816 | Inv. ex. |
| 51 | K | GA | 1111 | 1331 | 13 | 39 | 17303 | 51909 | Inv. ex. |
| 52 | L | CR | 775 | 963 | 21 | 57 | 20223 | 54891 | Inv. ex. |
| 53 | L | CR | 1053 | 1140 | 18 | 40 | 20520 | 45600 | Inv. ex. |
| 54 | L | GI | 684 | 1024 | 16 | 51 | 16384 | 52224 | Inv. ex. |
| 55 | M | CR | 824 | 1438 | 15 | 31 | 21570 | 44578 | Inv. ex. |
| 56 | M | CR | 1126 | 1390 | 14 | 39 | 19460 | 54210 | Inv. ex. |
| 57 | M | GI | 1306 | 1457 | 14 | 29 | 20398 | 42253 | Inv. ex. |
| 58 | N | CR | 856 | 1247 | 16 | 36 | 19952 | 44892 | Inv. ex. |
| 59 | N | CR | 1114 | 1555 | 12 | 30 | 18660 | 46650 | Inv. ex. |
| 60 | N | EG | 1279 | 1581 | 12 | 49 | 18972 | 77469 | Inv. ex. |

TABLE 21

| Experiment | Chemical ingredients | Steel type | Material measurement results YS MPa | TS MPa | EL % | λ % | TS × EL MPa•% | TS × λ MPa•% | |
|---|---|---|---|---|---|---|---|---|---|
| 61 | O | CR | 599 | 1012 | 17 | 40 | 17204 | 40480 | Inv. ex. |
| 62 | O | CR | 393 | 1071 | 18 | 43 | 19278 | 46053 | Inv. ex. |
| 63 | O | GI | 898 | 1090 | 16 | 49 | 17440 | 53410 | Inv. ex. |
| 64 | P | CR | 958 | 1396 | 11 | 36 | 15356 | 50256 | Inv. ex. |
| 65 | P | CR | 888 | 1279 | 15 | 50 | 19185 | 63950 | Inv. ex. |
| 66 | P | GA | 1237 | 1376 | 14 | 39 | 19264 | 53664 | Inv. ex. |
| 67 | Q | CR | 847 | 1180 | 16 | 47 | 18880 | 55460 | Inv. ex. |
| 68 | Q | CR | 1126 | 1367 | 12 | 40 | 16404 | 54680 | Inv. ex. |
| 69 | Q | EG | 963 | 1434 | 13 | 26 | 18642 | 37284 | Inv. ex. |
| 70 | R | CR | 564 | 1319 | 13 | 31 | 17147 | 40889 | Inv. ex. |
| 71 | R | CR | 792 | 1234 | 16 | 49 | 19744 | 60466 | Inv. ex. |
| 72 | R | GA | 784 | 1422 | 14 | 39 | 19908 | 55458 | Inv. ex. |
| 73 | S | CR | 675 | 1154 | 18 | 41 | 20772 | 47314 | Inv. ex. |
| 74 | S | CR | 769 | 1112 | 16 | 40 | 17792 | 44480 | Inv. ex. |
| 75 | S | GI | 722 | 1019 | 19 | 48 | 19361 | 48912 | Inv. ex. |
| 76 | T | CR | 548 | 1185 | 19 | 39 | 22515 | 46215 | Inv. ex. |
| 77 | T | CR | 980 | 1249 | 14 | 35 | 17486 | 43715 | Inv. ex. |
| 78 | T | GI | 663 | 1338 | 16 | 47 | 21408 | 62886 | Inv. ex. |
| 79 | U | CR | 515 | 1393 | 13 | 38 | 18109 | 52934 | Inv. ex. |
| 80 | U | CR | 827 | 1349 | 15 | 38 | 20235 | 51262 | Inv. ex. |
| 81 | U | GI | 430 | 1218 | 15 | 50 | 18270 | 60900 | Inv. ex. |
| 82 | V | CR | 1078 | 1413 | 13 | 36 | 18369 | 50868 | Inv. ex. |
| 83 | V | CR | 904 | 1294 | 16 | 40 | 20704 | 51760 | Inv. ex. |
| 84 | V | GI | 938 | 1391 | 14 | 37 | 19474 | 51467 | Inv. ex. |
| 85 | W | CR | 942 | 1181 | 14 | 35 | 16534 | 41335 | Inv. ex. |
| 86 | W | CR | 885 | 1133 | 15 | 66 | 16995 | 74778 | Inv. ex. |
| 87 | W | HR-GA | 550 | 1046 | 20 | 49 | 20920 | 51254 | Inv. ex. |
| 88 | X | CR | 728 | 1118 | 17 | 42 | 19006 | 46956 | Inv. ex. |
| 89 | X | CR | 769 | 1057 | 19 | 46 | 20083 | 48622 | Inv. ex. |
| 90 | X | HR-GA | 871 | 1071 | 18 | 44 | 19278 | 47124 | Inv. ex. |

TABLE 22

| Experiment | Chemical ingredients | Steel type | Material measurement results YS MPa | TS MPa | EL % | λ % | TS × EL MPa•% | TS × λ MPa•% | |
|---|---|---|---|---|---|---|---|---|---|
| 91 | Y | CR | 876 | 1233 | 17 | 46 | 20961 | 56718 | Inv. ex. |
| 92 | Y | CR | 1086 | 1285 | 16 | 36 | 20560 | 46260 | Inv. ex. |
| 93 | Y | GA | 896 | 1438 | 13 | 29 | 18694 | 41702 | Inv. ex. |
| 94 | Z | CR | 571 | 1029 | 17 | 50 | 17493 | 51450 | Inv. ex. |
| 95 | Z | CR | 847 | 1159 | 17 | 37 | 19703 | 42883 | Inv. ex. |
| 96 | Z | GA | 836 | 1103 | 19 | 51 | 20957 | 56253 | Inv. ex. |
| 97 | AA | CR | 669 | 1057 | 17 | 18 | 17969 | 19026 | Comp. ex. |
| 98 | AB | CR | 301 | 430 | 38 | 88 | 16340 | 37840 | Comp. ex. |
| 99 | AC | CR | 679 | 870 | 12 | 19 | 10440 | 16530 | Comp. ex. |
| 100 | AD | CR | 630 | 804 | 17 | 15 | 13668 | 12060 | Comp. ex. |
| 101 | AE | CR | 700 | 1088 | 19 | 23 | 20672 | 25024 | Comp. ex. |
| 102 | AF | — | — | — | — | — | — | — | Comp. ex. |
| 103 | AG | CR | 657 | 1128 | 15 | 46 | 16920 | 52315 | Inv. ex. |
| 104 | AG | GA | 682 | 1079 | 16 | 49 | 17264 | 53102 | Inv. ex. |
| 105 | AH | CR | 704 | 1163 | 16 | 43 | 18608 | 49581 | Inv. ex. |
| 106 | AH | EG | 956 | 1282 | 15 | 38 | 19230 | 48872 | Inv. ex. |
| 107 | AI | CR | 758 | 946 | 20 | 58 | 18920 | 55207 | Inv. ex. |
| 108 | AI | GI | 632 | 915 | 18 | 55 | 16470 | 50450 | Inv. ex. |
| 109 | AJ | CR | 471 | 985 | 21 | 49 | 20685 | 48324 | Inv. ex. |
| 110 | AJ | GI | 497 | 1025 | 19 | 52 | 19475 | 53166 | Inv. ex. |
| 111 | AK | CR | 597 | 984 | 20 | 51 | 19680 | 50125 | Inv. ex. |
| 112 | AK | GA | 564 | 1028 | 19 | 48 | 19532 | 49017 | Inv. ex. |
| 113 | AL | CR | 782 | 1075 | 19 | 38 | 20425 | 41336 | Inv. ex. |
| 114 | AL | GA | 871 | 1136 | 15 | 37 | 17040 | 42324 | Inv. ex. |

Experiment 5 is an example in which the end temperature of the hot rolling is low. The microstructure is stretched in one direction making it uneven, so the ductility and stretch flangeability are poor.

Experiment 10 is an example in which the cooling rate after coiling is high. The Cu particles insufficiently precipitate in the hot rolling process, the ratio of Cu particles incoherent with the bcc iron is small, and the stretch flangeability is poor.

Experiment 15 is an example in which the heating rate is large. The Cu particles insufficiently grow, the ratio of Cu particles incoherent with the bcc iron is small, and the stretch flangeability is poor.

Experiment 20 is an example in which the maximum heating temperature in the annealing process is low. A large number of coarse iron-based carbides which form starting points of fracture are included, so the ductility and the stretch flangeability are poor.

Experiment 23 is an example in which the maximum heating temperature in the annealing process is high. The Cu particles form solid solutions once during the heating and there are few Cu particles incoherent with the bcc iron, so the stretch flangeability is poor.

Experiment 30 is an example in which the average cooling rate of the first cooling process is high. The Cu particles insufficiently precipitate, so the ductility and the stretch flangeability are poor.

Experiment 34 is an example in which the average cooling rate of the first cooling process is low. Coarse iron-based carbides are formed, and the stretch flangeability is poor.

Experiment 35 is an example in which there is no tension in the first cooling process. The precipitation of Cu is insufficient, and the stretch flangeability is poor.

Experiment 39 is an example in which the cooling rate in the second cooling process is low. Coarse iron-based carbides are formed, and the stretch flangeability is poor.

Experiment 40 is an example in which no bending is applied in the first cooling process. The precipitation of Cu is insufficient, and the stretch flangeability is poor.

Experiment 44 is an example in which the holding time at 250 to 500° C. is long. Iron-based carbides excessively form, and the stretch flangeability is poor.

Experiment 45 is an example in which the holding time at 250 to 500° C. is short. Martensite excessively forms, and the stretch flangeability is poor.

Experiment 97 to 100 are examples in which the compositions of ingredients deviate from the predetermined range. In each case, sufficient properties could not be obtained.

Experiment 101 is an example in which the lower limit of the amount of Cu is exceeded. The density of Cu particles is low, and the stretch flangeability is poor.

The invention claimed is:

1. A steel sheet which contains,
by mass %,
C: 0.075 to 0.300%,
Si: 0.30 to 2.50%,
Mn: 1.30 to 3.50%,
P: 0.001 to 0.030%,
S: 0.0001 to 0.0100%,
Al: 0.005 to 1.500%,
Cu: 0.15 to 2.00%,
N: 0.0001 to 0.0100%, and
O: 0.0001 to 0.0100%,
contains, as optional elements,
Ti: 0.005 to 0.150%,
Nb: 0.005 to 0.150%,
B: 0.0001 to 0.0100%,
Cr: 0.01 to 2.00%,
Ni: 0.01 to 2.00%,
Mo: 0.01 to 1.00%,
W: 0.01 to 1.00%,
V: 0.005 to 0.150%, and
one or more of Ca, Ce, Mg, and REM: total 0.0001 to 0.50%, and
has a balance of iron and unavoidable impurities, wherein
a tensile maximum strength of said steel sheet is 900 MPa or more,
a structure of said steel sheet contains a ferrite phase and martensite phase,
a ratio of Cu particles incoherent with bcc iron is 15% or more with respect to the Cu particles as a whole,
a density of Cu particles in the ferrite phase is $1.0 \times 10^{18}/\text{m}^3$ or more, and
an average particle size of Cu particles in the ferrite phase is 2.0 nm or more.

2. The steel sheet of claim 1 characterized in that the structure in a range of ⅛ thickness to ⅜ thickness of said steel sheet comprises, by volume fraction,
a ferrite phase: 10 to 75%,
bainitic ferrite phase and/or bainite phase: 50% or less,
tempered martensite phase: 50% or less,
fresh martensite phase: 15% or less, and
residual austenite phase: 20% or less.

3. A galvanized steel sheet characterized by comprising the steel sheet of claim 2 on the surface of which a galvanized layer is formed.

4. A galvanized steel sheet characterized by comprising the steel sheet of claim 1 on the surface of which a galvanized layer is formed.

5. A method of production of steel sheet comprising
a hot rolling process of heating a slab which contains,
by mass %,
C: 0.075 to 0.300%,
Si: 0.30 to 2.50%,
Mn: 1.30 to 3.50%,
P: 0.001 to 0.030%,
S: 0.0001 to 0.0100%,
Al: 0.005 to 1.500%,
Cu: 0.15 to 2.00%,
N: 0.0001 to 0.0100%,
O: 0.0001 to 0.0100%,
contains, as optional elements
Ti: 0.005 to 0.150%,
Nb: 0.005 to 0.150%,
B: 0.0001 to 0.0100%,
Cr: 0.01 to 2.00%,
Ni: 0.01 to 2.00%,
Mo: 0.01 to 1.00%,
W: 0.01 to 1.00%,
V: 0.005 to 0.150%, and
one or more of Ca, Ce, Mg, and REM: total 0.0001 to 0.50%, and
has a balance of iron and unavoidable impurities, directly, or after cooling once, to 1050° C. or more, rolling with a lower limit of a temperature of 800° C. or the Ar3 transformation point, whichever is higher, and coiling it at 500 to 700° C. in temperature and
an annealing process of heating the coiled steel sheet by an average heating rate at 550 to 700° C. of 1.0 to 10.0° C./sec up to a maximum heating temperature of 740 to 1000° C., then cooling by an average cooling rate from the maximum heating temperature to 700° C. of 1.0 to 10.0° C./sec, imparting strain to the steel sheet from the maximum heating temperature to 700, and cooling by a cooling rate from 700° C. to the Bs point or 500° C. of 5.0 to 200.0° C./sec,
wherein the strain is imparted to the steel sheet by applying 5 to 50 MPa of tension to the steel sheet.

6. The method of production of steel sheet of claim 5 characterized by having a cold rolling process, after said hot rolling process and before said annealing process, of pickling the coiled steel sheet, then rolling it by a screwdown rate of a screwdown rate 35 to 75%.

7. The method of production of steel sheet of claim 6 characterized by the strain being imparted to the steel sheet in said annealing process while bending one time or more in a range giving an amount of tensile strain at the outermost circumference of 0.0007 to 0.0910.

8. A method of production of galvanized steel sheet characterized by producing steel sheet by the method of production of steel sheet of claim 6, then electrogalvanizing it.

9. A method of production of galvanized steel sheet characterized by producing steel sheet by the method of production according to claim 6 after the cooling to the Bs point or 500° C. of which performing hot dip galvanization.

10. The method of production of steel sheet of claim 7 characterized in that said bending is performed by pressing the steel sheet against a roll with a roll diameter of 800 mm or less.

11. A method of production of galvanized steel sheet characterized by producing steel sheet by the method of production of steel sheet of claim 7, then electrogalvanizing it.

12. A method of production of galvanized steel sheet characterized by producing steel sheet by the method of production according to claim 7 after the cooling to the Bs point or 500° C. of which performing hot dip galvanization.

13. The method of production of steel sheet of claim 5 characterized by the strain being imparted to the steel sheet in said annealing process while bending one time or more in a range giving an amount of tensile strain at the outermost circumference of 0.0007 to 0.0910.

14. The method of production of steel sheet of claim 13 characterized in that said bending is performed by pressing the steel sheet against a roll with a roll diameter of 800 mm or less.

15. A method of production of galvanized steel sheet characterized by producing steel sheet by the method of production of steel sheet of claim 13, then electrogalvanizing it.

16. A method of production of galvanized steel sheet characterized by producing steel sheet by the method of production according to claim 13 after the cooling to the Bs point or 500° C. of which performing hot dip galvanization.

17. A method of production of galvanized steel sheet characterized by producing steel sheet by the method of production of steel sheet of claim 14, then electrogalvanizing it.

18. A method of production of galvanized steel sheet characterized by producing steel sheet by the method of production of steel sheet of claim 5, then electrogalvanizing it.

19. A method of production of galvanized steel sheet characterized by producing steel sheet by the method of production according to claim 5 after the cooling to the Bs point or 500° C. of which performing hot dip galvanization.

20. A method of production of galvanized steel sheet according to claim 19 characterized by performing alloying treatment at 470 to 650° C. in temperature after the hot dip galvanization.

* * * * *